(12) United States Patent
Puppala et al.

(10) Patent No.: US 12,547,454 B2
(45) Date of Patent: Feb. 10, 2026

(54) METHOD AND A SYSTEM FOR COMMAND BUFFER MANAGEMENT IN NEURAL NETWORK PROCESSING

(71) Applicant: Blaize, Inc., El Dorado Hills, CA (US)

(72) Inventors: Venkata Ganapathi Puppala, Hyderabad (IN); Kota Vamsi Darsi, Cumbum (IN); Matthew Fortune, Leeds (GB)

(73) Assignee: Blaize, Inc., El Dorado Hills, CA (US)

( * ) Notice: Subject to any disclaimer, the term of this patent is extended or adjusted under 35 U.S.C. 154(b) by 179 days.

(21) Appl. No.: 18/217,541

(22) Filed: Jul. 1, 2023

(65) Prior Publication Data

US 2024/0411587 A1 Dec. 12, 2024

(51) Int. Cl.
*G06F 9/30* (2018.01)
*G06F 9/38* (2018.01)
*G06F 9/48* (2006.01)
*G06F 9/54* (2006.01)

(52) U.S. Cl.
CPC .......... *G06F 9/4881* (2013.01); *G06F 9/3851* (2013.01); *G06F 9/544* (2013.01)

(58) Field of Classification Search
CPC ....... G06F 9/4881; G06F 9/3851; G06F 9/544
See application file for complete search history.

(56) References Cited

U.S. PATENT DOCUMENTS

| | | | |
|---|---|---|---|
| 6,904,446 B2 | 6/2005 | Dibrino | |
| 7,681,014 B2 * | 3/2010 | Jensen | G06F 9/3854 712/214 |
| 7,925,869 B2 * | 4/2011 | Kelsey | G06F 9/3851 712/220 |
| 10,585,667 B2 * | 3/2020 | Grochowski | G06F 9/30003 |
| 11,416,282 B2 * | 8/2022 | Koneru | G06F 9/4843 |
| 2002/0046230 A1 * | 4/2002 | Dieterich | G06F 9/4843 718/107 |
| 2008/0046689 A1 * | 2/2008 | Chen | G06F 9/3012 712/E9.055 |
| 2012/0102470 A1 * | 4/2012 | Yang | G06F 11/3632 717/130 |
| 2018/0253890 A1 | 9/2018 | Cook et al. | |
| 2019/0235917 A1 * | 8/2019 | Koneru | G06F 9/4843 |

\* cited by examiner

*Primary Examiner* — Corey S Faherty
(74) *Attorney, Agent, or Firm* — Brian R. Short

(57) ABSTRACT

Disclosed herein is a graph streaming processing system comprising a thread scheduler comprising a first component and a second component. The first component is configured to schedule a first set of threads of a first node to a first processor associated with the first node and initialize status of a completion pointer to an initial value. The completion pointer is associated with a command buffer of the first node. The first component is configured to detect the execution of the first set of threads and generation of a data unit and update the status of the completion pointer to an updated value indicating execution of the first set of threads in response to the generation of the data unit. The second component is configured to schedule a second set of threads of a plurality of second nodes to a second processor based on the status of the completion pointer. The second processor is associated with the plurality of second nodes and the second set of threads of the plurality of second nodes are dependent on execution of the first set of threads.

20 Claims, 10 Drawing Sheets

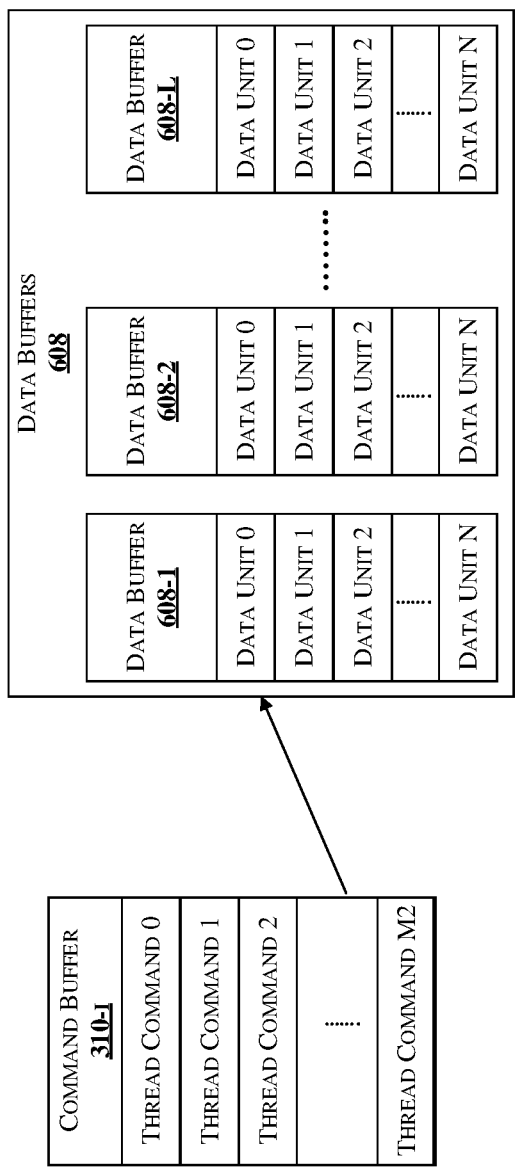
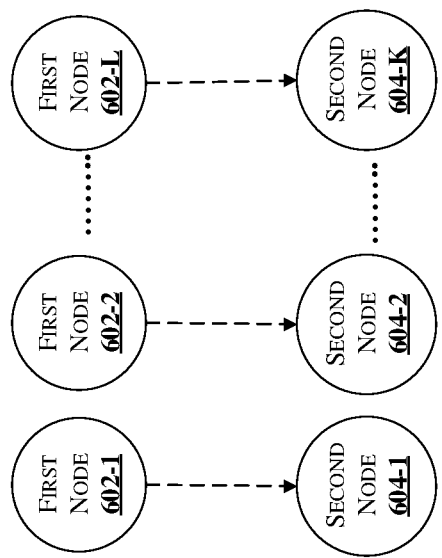
FIGURE 6C
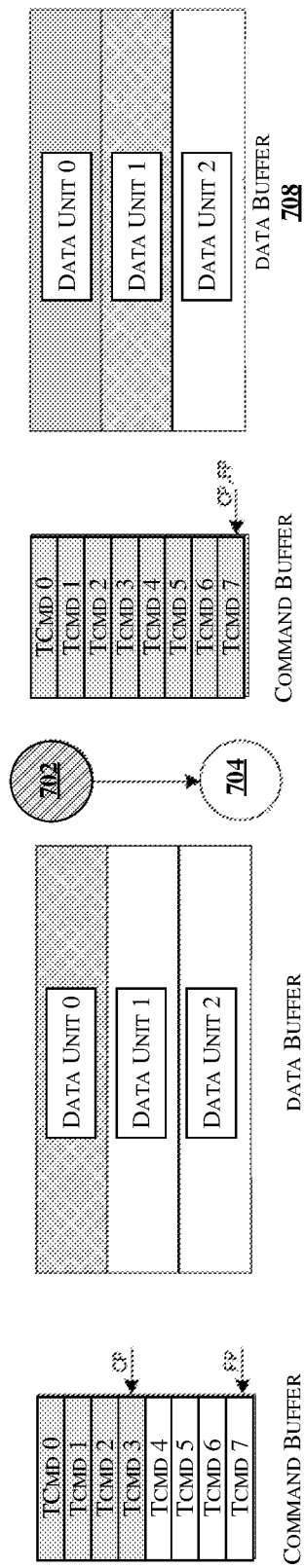
FIGURE 7A
FIGURE 7B

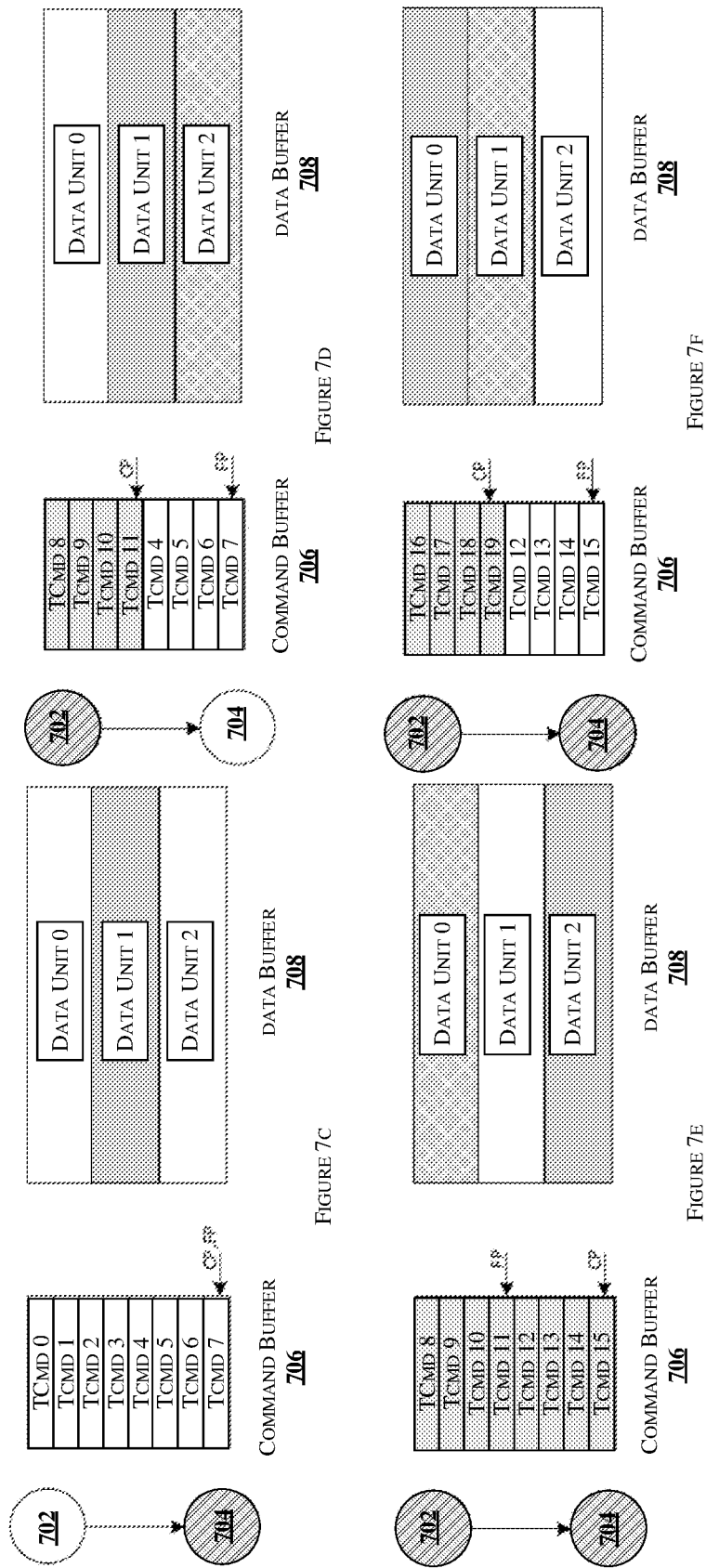

METHOD AND A SYSTEM FOR COMMAND BUFFER MANAGEMENT IN NEURAL NETWORK PROCESSING

FIELD OF THE DISCLOSURE

Embodiments of the present disclosure are related, in general to a processor architecture and in particular to an architecture of a graph streaming processing system and a method thereof.

BACKGROUND

A graph streaming processing system generally comprises an array of processors to execute a workflow, for example, an image processing operation such as image classification or image segmentation. The graph streaming processing system enables parallel processing of threads associated with different stages of the workflow using an array of processors or multi-core processors. Conventional graph streaming processing systems distribute execution of each stage of the workflow among the different processors of the processor array. If the graph involves neural network operations, specialized processors called neural network accelerators are used to process such operations since the neural network accelerators are designed to optimize and fasten the execution of the neural network operations.

Further, in the conventional graph streaming processing systems, each processing operation requires an input data buffer to read inputs and an output data buffer to write outputs. Currently, these data buffers occupy ample amount of memory for each processing operation. Similarly, command buffers that temporarily store thread commands generated by one or more processors also occupy significant amount of memory that may not be essential. Thus, there is a need for an efficient graph streaming processing system that optimizes the amount of memory space required to store the inputs, commands and outputs of each processing operation, thereby substantially reducing the requirement of memory. Further, there is also a requirement to manage such optimized memory spaces for sharing across the processing systems.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a graph streaming processing system comprising a thread scheduler comprising at least one first component and at least one second component. The at least one first component is configured to schedule a first set of threads of a first node to a first processor associated with the first node and initialize status of a completion pointer to an initial value. The completion pointer is associated with a command buffer of the first node. The at least one first component is configured to detect the execution of the first set of threads and generation of a data unit and update the status of the completion pointer to an updated value indicating execution of the first set of threads in response to the generation of the data unit. The at least one second component is configured to schedule a second set of threads of the plurality of second nodes to a second processor based on the status of the completion pointer. The second processor is associated with the plurality of second nodes and the second set of threads of the plurality of second nodes are dependent on the execution of the first set of threads.

Further, the disclosure relates to a method performed by a graph streaming processing system. The method comprises scheduling, by at least one first component of a thread scheduler of the graph streaming processing system, a set of threads of a first node to a first processor associated with the first node. The method comprises initializing, by the at least one first component, status of a completion pointer to an initial value, wherein the completion pointer is associated with a command buffer of the first node. The method comprises detecting, by the at least one first component, the execution of the first set of threads and generation of a data unit. The method comprises updating, by the at least one first component, the status of the completion pointer to an updated value indicating execution of the first set of threads in response to the generation of the data unit. The method comprises scheduling, by at least one second component of the thread scheduler, a set of threads of a plurality of second nodes to a second processor based on the status of the completion pointer. The second processor is associated with the plurality of second nodes and the second set of threads of the plurality of second nodes are dependent on execution of the first set of threads.

The foregoing summary is illustrative only and is not intended to be in anyway limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

FIGS. 6a, 6b and 6c, each illustrate an operation associated with the command buffer and the private data buffer in accordance with some embodiments of the present disclosure;

FIGS. 7a-7f illustrates an example of the command buffer and the data buffer in accordance with the embodiments of the present disclosure;

Figure 1:
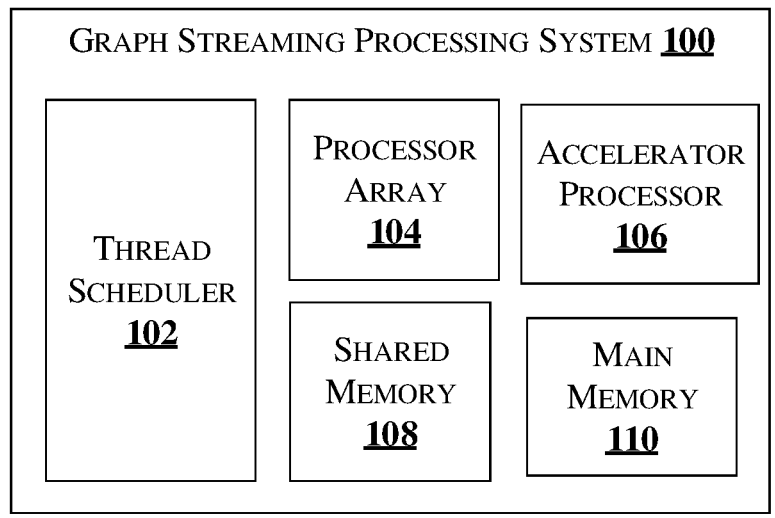
FIG. 1 illustrates an exemplary architecture of a graph streaming processing system in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of a graph streaming processing system in accordance with some embodiments of the present disclosure.

As shown in FIG. 1, the exemplary graph streaming processing system 100 is configured to enable execution of one or more graph-based workflow operations, which are not solely related to neural network applications, in a streaming manner. In an embodiment, the graph streaming processing system 100 comprises one or more components such as a thread scheduler 102, a processor array 104, an accelerator processor 106, a shared memory 108 and a main memory 110 communicatively coupled with each other. The thread scheduler 102 dispatches threads of a workflow to one of the processor array 104 and the accelerator processor 106 based on predefined processing operations configured with each processor. The processor array 104 and the accelerator processor 106 are configured to execute one or more threads scheduled by the thread scheduler 102. Both the processor array 104 and the accelerator processor 106 access and use the shared memory 108 to retrieve input data required for execution of one or more threads or to store output data generated by execution of one or more threads. The main memory 110 is used to store and/or retrieve information about input data required to execute the operations associated with the workflow. For example, if the workflow relates to image processing techniques such as image classification or image segmentation, the main memory 110 stores a plurality of images used as input for image classification or segmentation.

In one embodiment, the main memory 110 stores input required to execute only the initial stages of the workflow. For example, the main memory 110 stores raw data such as an input image on which the image segmentation needs to be performed. In one embodiment, the shared memory 108 is a temporary memory such as a cache that stores intermediate inputs and outputs of the workflow. For example, the shared memory 108 stores outputs generated by the processor array 104 and/or the accelerator processor 106 in response to executing threads of a stage of the workflow until the outputs are read by the processor array 104 and/or the accelerator processor 106 to execute threads of a next stage of the workflow.

In an embodiment, the graph streaming processing system 100 may execute the graph-based workflow in a streaming manner. The graph streaming processing system 100 may decompose the workflow into a data structure such as a graph structure that comprises a plurality of stages. Each stage comprises a plurality of nodes, each node represents a thread or a set of threads of the workflow. The processor array 104 or the accelerator processor 106 may execute the threads of each node of the workflow as allocated by the thread scheduler 102.

In an embodiment, the processor array 104 may be a multi-core processor that is programmable and capable of executing any type of operations related to the graph. In one embodiment, the processor array 104 may be an array of plurality of processors working in parallel. Each processor of the processor array 104 may be implemented as a hardware component or as a combination of both hardware and software. Each processor may have access to a dedicated or shared memory, input/output interface, microprocessors, microcontrollers, programmable logic devices, and the like. Each processor may be a general-purpose processor, an application specific integrated circuit, a digital signal processor, a media processor, a field programmable gate array, and the like. The processor array 104 is capable of performing any type of general-purpose operations such as addition, multiplication, shifting, and the like. In particular, the processor array 104 may be configured to perform operations that may not be generally performed by the accelerator processor 106 as the accelerator processor 106 may be optimised to perform only a fixed number of operations explained in detail below. For example, the processor array 104 is used to perform operations such as a 6×6 convolution operation, sigmoid function operation, etc.

The accelerator processor 106 may be a processor that is configured to process fixed functions such as neural network operations. In an embodiment, the accelerator processor 106 may be implemented as a hardware component, a software or a combination of both hardware and software. When the accelerator processor 106 is implemented as a hardware, the accelerator processor 106 may comprise and/or have access to a memory, input/output interfaces and one or more processors optimized to implement fixed functions. In some embodiments, the accelerator processor 106 may also comprise software components such as acceleration libraries including libraries that provide fixed functions, including, but not limited to, predefined and optimized implementations of neural network layers and other types of neural network structures. The accelerator processor 106 may interface with the software components to execute the fixed functions in an optimized and an accelerated manner. In some embodiments, the accelerator processor 106 may comprise a multi-core processor, including a number of processor elements, to distribute the fixed functions among each one of the processor elements and implement the functions of the accelerator processor 106 in parallel.

In some embodiments, the accelerator processor 106 is configured to implement one or more operations that are widely used in deep neural networks. For example, the accelerator processor 106 is configured to perform fixed functions including a 1×1 convolution operation, a 4×4 convolution operation, a matrix multiplication operation and a depth wise convolution operation. In another example, the accelerator processor 106 is configured to perform other fixed functions including a batch normalization operation, a rectified linear unit operation, a leaky rectified linear unit operation and a binary summation operation. The processor array 104 and the accelerator processor 106 may be coupled with the shared memory 108.

In some embodiments, the shared memory 108 may be, without limitation, a level-2 cache memory required to store output data generated by the accelerator processor 106 and/or the processor array 104. The shared memory 108 is shared by the processor array 104 and the accelerator processor 106 to store or retrieve information. The shared memory 108 comprises input data required to execute a thread associated with a node of the graph. The shared memory 108 may be coupled with read and write interfaces to read and write data from and into the shared memory 108. The processor array 104 and the accelerator processor 106 may read data from the shared memory 108 and write data into the shared memory 108 while executing the operations of the workflow assigned by the thread scheduler 102.

In some embodiment, the main memory 110 may be, without limitation, a random access memory (RAM), required to store input images required to perform image processing. The main memory 110 may also store other information required to execute threads such as command buffers which are later explained with the help of FIGS. 3, 5, 6 and 7. The main memory 110 may be communicatively coupled with the thread scheduler 102 to execute threads of the workflow.

In one embodiment, the thread scheduler 102 schedules a plurality of threads, associated with the workflow of operations, to one of the processor array 104 and the accelerator processor 106. The threads may be related to the workflow, that include one or more processing techniques such as image processing, represented as a data structure such as a graph. The one or more processing techniques may include, but not limited to, image classification, image segmentation and the like. The thread scheduler 102 is coupled with the processor array 104 and the accelerator processor 106 to dispatch threads to the processors 104 and 106 and receive thread retire events from the processor array 104 and the accelerator processor 106 in response to execution of threads by the processors 104 and 106. The thread scheduler 102 is also coupled with the main memory 110 to store and/or discard one or more threads.

In an embodiment, the thread scheduler 102 is a hardware module comprising a plurality of components each associated with a stage of the graph structure. Each component of the thread scheduler 102 may dispatch threads of a node of a stage to either the processor array 104 or the accelerator processor 106. Further the components of the thread scheduler 102 may also track execution of the dispatched thread and may dispatch further threads of the node or another node upon completion of execution of previously dispatched threads.

In one embodiment, the thread scheduler 102 may include at least one first component associated with a parent stage of the graph and at least one second component associated with a child stage of the graph. The parent stage of the graph may include a plurality of parent nodes executing tasks that generate output data, which is further used as input for executing tasks of a plurality of child nodes of the child stage of the graph. In one embodiment, the thread scheduler 102 may dispatch threads of a parent node and a child node at the same time to achieve parallel dispatching of threads, which is further explained in detail in FIGS. 3, 6a-6c and 7a-7f. The thread scheduler 102 may dispatch the threads of the plurality of nodes to the processor array 104 or the accelerator processor 106 for parallel processing.

Figure 2:
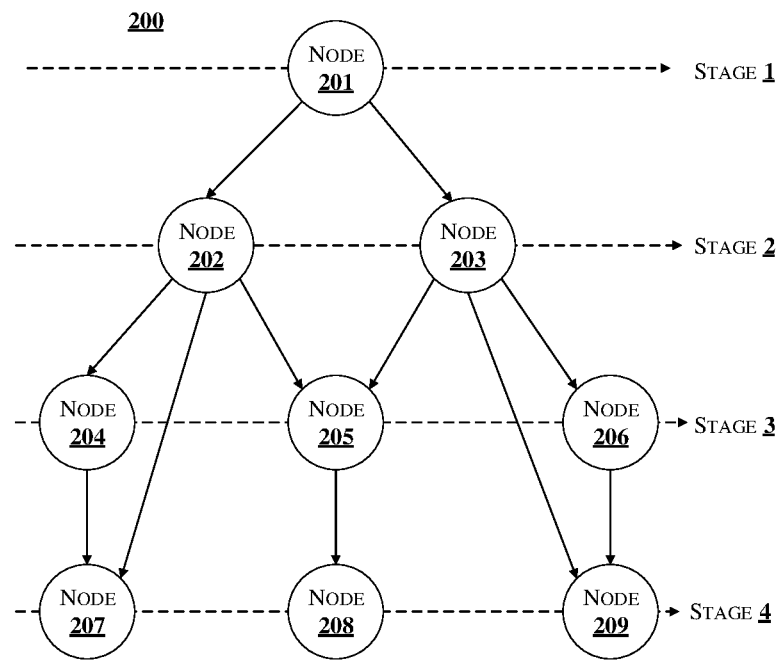
FIG. 2 illustrates an exemplary graph comprising a plurality of stages in accordance with some embodiments of the present disclosure.

FIG. 2 illustrates an exemplary graph comprising a plurality of stages in accordance with some embodiments of the present disclosure.

The graph 200 may comprise a plurality of stages stage 1, stage 2, . . . stage 4, and a plurality of nodes 201, 202, 203, 204, 205, 206, 207, 208 and 209 associated with the plurality of stages. One of the plurality of nodes is a root node which is an ancestor of all other nodes in the graph. As shown in FIG. 2, node 201 is the root node of the graph 200. The graph 200 also comprises a plurality of parent nodes and child nodes. A parent node is a node that executes one or more tasks to generate an output that is used as an input by a child node. The child node is a dependent node, that receives output generated by a parent node as an input to execute one or more tasks allocated to the child node. As illustrated in the graph 200, the node 202 and node 203 are child nodes of the root node 201. The node 204, and node 205 are child nodes of the parent node 202. The node 206, and node 209 are child nodes of the parent node 203. The node 208 is a child node of the node 205. The node 207 is a child node for the node 202 and the node 204 and the node 209 is a child node for the node 203 and the node 206.

In a preferred embodiment, the graph 200 may represent one or more tasks associated with performing an image processing technique on a plurality of images such as image segmentation, image classification, etc. The root node 201 may receive an image or a part of image as an input, the image may traverse through each node of the graph, which process the image to generate one or more output images at final nodes of the graph such as nodes 207, 208 and 209. Each node or a group of nodes of the graph may correspond to an image processing operation, for example, smoothing, shading, classification, segmentation, edge detection and the like. In this embodiment, the part of an image may be a slice of the image of size 8×8, preferably comprising 8 rows of pixels and 8 columns of pixels of an image. In this embodiment, each node of the graph may receive one or more slices of an image as input for processing a thread associated with the node and may generate one or more slices of image as an output.

Figure 3:
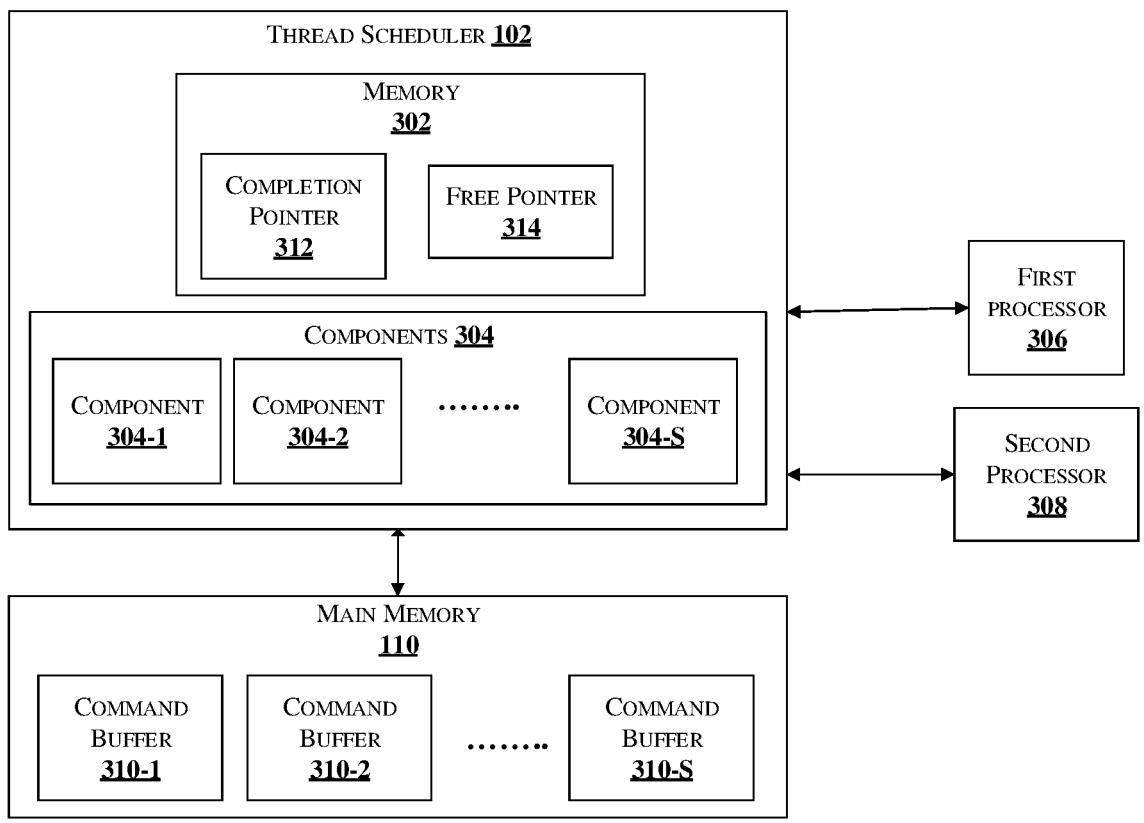
FIG. 3 illustrates an architecture of a thread scheduler of FIG. 1 in accordance with some embodiments of the present disclosure.

FIG. 3 illustrates an architecture of a thread scheduler of FIG. 1 in accordance with some embodiments of the present disclosure.

The thread scheduler 102 comprises a memory 302 and one or more hardware components 304 to schedule threads between the processor array 104 and the accelerator processor 106. The one or more hardware components 304 may include component 304-1, component 304-2, . . . component 304-S, wherein S depends on a number of stages in the input graph. In one embodiment, S may be the number of stages in a graph. In another embodiment, S may be a multiple or a factor of the number of stages of the graph. For example, there can be 7 components in a thread scheduler to execute a graph comprising 7 stages. In another example, there can be 14 components in the thread scheduler to execute a graph of 28 stages. In this embodiment, when the number of components S is less than the number of stages in the graph, the number of stages is broken down into multiples of S and may be executed accordingly. Each component is configured to schedule threads of a stage of a graph to any of the processor array 104 and the accelerator processor 106.

The thread scheduler 102 identifies a plurality of stages of the graph 200, which may be parent stages and child stages based on their dependency. The thread scheduler 102 identifies a plurality of parent nodes of the parent stages and a plurality of child nodes of the child stages for efficient execution of the graph in accordance with the embodiments of the present disclosure. In the example graph 200 of FIG. 2, the thread scheduler 102 identifies stage 1 including node 201, stage 2 including nodes 202, and 203, stage 3 including nodes 204, 205 and 206 and stage 4 including nodes 207, 208 and 209. It is evident from the FIG. 2 that the threads of nodes 202 and 203 can only be executed after the execution of the threads of node 201 and hence stage 1 is a parent stage and stage 2 is a child stage. Further, node 201 is a parent node for the nodes 202 and 203. Similarly, stage 2 is a parent stage for stage 3 and stage 4. Hence, nodes 202 and 203 act as parent nodes for the child nodes 204, 205, 206, 207 and 209. Nodes 204 and 206 also act as parent nodes for the nodes 207, and 209 respectively. The thread scheduler 102 identifies parent stages and child stages and further identifies parent nodes and child nodes for efficient thread scheduling of the threads of the nodes of the parent stages and the child stages.

Further, the thread scheduler 102 may enable dispatch and parallel execution of the threads of a pair of parent and child nodes. The thread scheduler 102 dispatches a set of threads of the parent node, detects execution of the thread and generation of at least one data unit upon the execution. The thread scheduler 102 determines if a minimum amount of data required to execute at least one thread of the child node is available. Upon determining the availability, the thread scheduler 102 dispatches the threads of the child node even before completing execution of all the threads of the parent node. Once the child node consumes the minimum amount of data, for example one data unit, the thread scheduler 102 detects the consumption of the minimum amount of data and schedules further threads of the parent node. If the thread scheduler 102 detects that the minimum amount of data has not been generated by the thread of the parent node, the thread scheduler 102 dispatches further threads of the parent node. Thus, by way of determining minimum data availability for execution of child threads, the thread scheduler 102 enables parallel execution of the threads of the parent nodes as well as child nodes of the graph 200.

In the above example, the thread scheduler 102 dispatches threads of nodes 201, 202 and 204 in parallel. In this example, the thread scheduler 102 dispatches a thread of the node 201, detects execution of the thread and generation of at least one data unit upon the execution. Further, the thread scheduler 102 determines a minimum amount of data required to execute at least one thread of the child nodes 202 and 204 and dispatches the threads of the child nodes 202 and 204 even before completing execution of all the threads of the parent node 201. Once the child nodes 202 and 204 consume the data unit, the thread scheduler 102 detects the consumption of the data unit and schedules further threads of the parent node 201. Thus, the thread scheduler 102 enables parallel execution of the threads of the parent nodes as well as child nodes of the graph.

In some embodiments, the thread scheduler 102 may group threads associated with one or more nodes to dispatch them to the processor array 104 and the accelerator processor 106.

The thread scheduler 102 may also assess a type of processing, also referred as an operation, required for execution of each thread and maps the thread to the processor array 104 or the accelerator processor 106. The thread scheduler 102 determines the type of processing based on predefined processing information associated with the threads. The predefined processing information may be one or more operations that can be executed by the processor array 104 and the accelerator processor 106. The predefined processing information of the accelerator processor 106 may include, but not limited to, 1×1 convolution, 4×4 convolution, matrix multiplication, and depth wise convolution operations. The predefined processing information of the processor array 104 may include, but not limited to, 6×6 convolution operations and sigmoid functions.

The thread scheduler 102 determines if an operation associated with a thread of a node can be performed by the accelerator processor 106 by comparing the operation with predefined processing information of the accelerator processor 106. In one embodiment, the thread scheduler 102 compares the operation associated with a thread of a node with the predefined processing information of the accelerator processor 106. If the thread scheduler 102 determines that the operation matches with any operation of the predefined processing information of the accelerator processor 106, the thread scheduler 102 determines that the operation can be performed by the accelerator processor 106 array 104. For example, if the operation associated with the thread is a 4×4 convolution operation, the thread scheduler 102 determines that the accelerator processor 106 can perform the operation. If the operation does not match with any operation of the predefined processing information of the accelerator processor 106, the thread scheduler 102 determines that the operation cannot be performed by the accelerator processor 106 array 104. In another example, if the predefined processing information of the accelerator processor 106 includes 3×3 convolution operation only and when the operation associated with the thread is a 6×6 convolution operation, the thread scheduler 102 determines that the accelerator processor 106 cannot perform the operation.

Based on a determination that the operation can be performed by the accelerator processor 106, the thread scheduler 102 maps the thread to the accelerator processor 106. Alternatively, if the thread scheduler 102 determines that the operation associated with the thread cannot be performed by the accelerator processor 106, the thread scheduler 102 compares the operation with the predefined processing information of the processor array 104. The thread scheduler 102 maps the thread to the processor array 104, upon determining that the operation corresponds to the predefined processing information of the processor array 104. The thread scheduler 102 may store the mapping of each thread with the processor array 104 or the accelerator processor 106 in a memory configured within the thread scheduler 102 (not shown), or the main memory 110. In one example, the thread scheduler 102 may store the mapping in the form of a mapping table. Thus, the thread scheduler 102 may dispatch threads to the processor array 104 or the accelerator processor 106 based on a type of processing required for execution of the threads.

The thread scheduler 102 also determines availability of input data required to execute each thread. Further, the thread scheduler 102 determines whether a predefined threshold buffer size is available on a private data buffer of the accelerator processor 106, which will be further explained in detail below. Subsequently, the thread scheduler 102 dispatches one or more threads to the processor array 104 and the accelerator processor 106 based on the sequence of threads, mapping, availability of input data and the predefined threshold buffer size of the private data buffer. The predefined threshold buffer size indicates a minimum amount of memory required to store minimum output data generated by execution of at least one thread of a node. The thread scheduler 102 may also include states of input buffers and states of output buffers associated with a thread while dispatching the thread to the processor array 104 or the accelerator processor 106. The states of the input buffers, also referred herein as input states, indicate a location in the memory where the input data required for the execution of the thread is stored. The states of the output buffers, also referred to as output states, indicate a location in the memory where output data needs to be stored. The memory may include shared memory 108 or the private data buffer of the accelerator processor 106. The input states may include information, but not limited to, a type of the input buffer such as two-dimensional, three-dimensional, width and height of the input buffer, where the input data is stored. In one embodiment, the input buffers may be located in a main memory 110 within or external to the graph streaming processing system 100.

Figure 4:
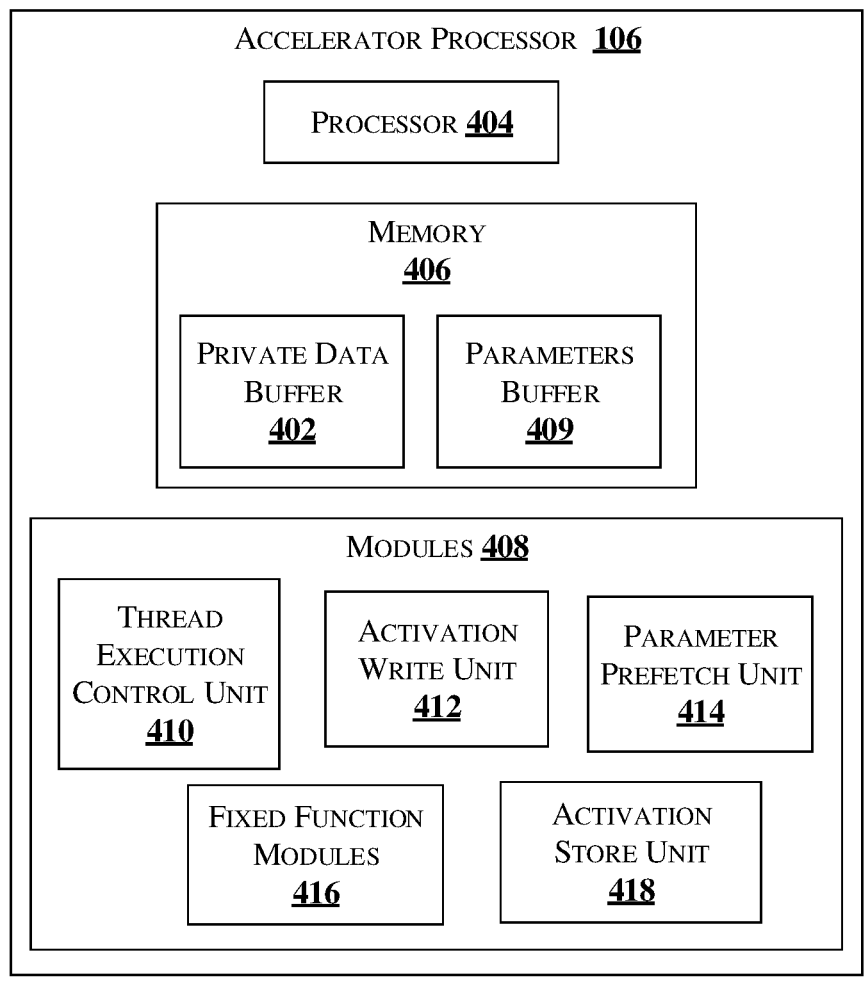
FIG. 4 illustrates an architecture of an accelerator processor of FIG. 1 in accordance with some embodiments of the present disclosure.

The output states may include information about where the output data needs to be stored upon execution of the thread, such as the shared memory 108 or private data buffer 402 of the accelerator processor 106 (shown in FIG. 4). For example, the output states may include a bit indicating "0" if the output data needs to be stored in the shared memory 108 and a bit "1" if the output data needs to be stored into the private data buffer 402 of the accelerator processor 106. The output states may be assigned by the thread scheduler 102 while mapping each thread to either the processor array 104 or the accelerator processor 106. In one embodiment, the thread scheduler 102 may map a current thread to the accelerator processor 106 and a subsequent thread, that depends on the current thread to the processor array 104. In this embodiment, the thread scheduler 102 may set a value for the output states bit, corresponding to the current thread, indicating that the output data needs to be stored in the private data buffer 402 of the accelerator processor 106. This enables the subsequent thread to read input data from the private data buffer 402 thereby reducing time required to fetch data from the shared memory 108. In another embodiment, the thread scheduler 102 may map a current thread to the processor array 104 and a subsequent thread, that depends on the current thread to the accelerator processor 106. In this embodiment, the thread scheduler 102 may set a value for the output states bit, corresponding to the current thread, indicating that the output data needs to be stored in the shared memory 108.

The thread scheduler 102 identifies a thread mapped to the processor array 104 and dispatches the thread to the processor array 104 including information about states of buffers associated with the thread. The processor array 104 receives the thread and the states of buffers and determines input data required to execute the thread. The processor array 104 fetches the input data using a read interface associated with the main memory 110 if the thread is the first thread of the graph. If the thread is not the first thread, the processor array 104 reads input data required to execute the thread from the shared memory 108 using a read interface of the shared memory 108. The input data may be at least one data unit such as, without limiting to, an image or a slice of an image or a plurality of slices of an image. In a preferred embodiment, a data unit is a slice of an image. The processor array 104 may execute the thread and may generate output data comprising at least one data unit.

The processor array 104 may write the output data into the shared memory 108 using a write interface of the shared memory 108 based on the output states, that indicate that a subsequent thread dependent on the thread will be dispatched to the processor array 104. In some embodiments, the processor array 104 may also write the output data into the private data buffer 402 of the accelerator processor 106 using a write interface of the accelerator processor 106, based on the output states, that indicate that the subsequent thread will be dispatched to the accelerator processor 106. The procedure of writing data into the private data buffer 402 of the accelerator processor 106 is explained in detail further below with the help of FIG. 4. The processor array 104 retires the thread generates thread retire events in response, and sends the thread retire events to the thread scheduler 102. The thread scheduler 102 receives the thread retire events from the processor array 104 and determines that the thread dispatched to the processor array 104 has been executed.

In some embodiments, the processor array 104 writes the output data into the private data buffer 402, upon determination that the subsequent thread is being dispatched to the accelerator processor 106. In some embodiments, the processor array 104 writes the output data into the shared memory 108, upon determination that the subsequent thread is being dispatched to the processor array 104. In some embodiments, the processor array 104 writes the output data into the shared memory 108 as well as the private data buffer 402, upon determining that subsequent threads are being dispatched to the processor array 104 and the accelerator processor 106.

The thread scheduler 102 identifies a thread mapped to the accelerator processor 106 and dispatches the thread to the accelerator processor 106. The accelerator processor 106 fetches the input data using a read interface associated with the main memory 110 if the thread is the first thread of the graph. If the thread is not the first thread, the accelerator processor 106 reads input data, required to execute the thread from the shared memory 108 using a read interface of the shared memory 108. The input data may comprise at least a data unit generated by its previous threads. The accelerator processor 106 may execute the thread and may generate output data such as one or more data units.

The accelerator processor 106 may write the output data into the private data buffer 402 of the accelerator processor 106, based on the output states, that indicate that a subsequent thread dependent on the thread will be dispatched to the processor array 104. In some embodiments, the accelerator processor 106 may also write the output data into the shared memory 108 at step 124 using a write interface of the shared memory 108, based on the output states, that indicate that a subsequent thread dependent on the thread 112 will be dispatched to the accelerator processor 106. In some embodiments, the accelerator processor 106 writes the output data into the shared memory 108 as well as the private data buffer 402, upon determining that subsequent threads are being dispatched to the processor array 104 and the accelerator processor 106. The accelerator processor 106 further retires the thread, generates thread retire events in response, and sends thread retire events to thread scheduler 102 at step 126. The thread scheduler 102 receives the thread retire events from the accelerator processor 106 and determines that the thread dispatched to the accelerator processor 106 has been executed.

As illustrated in FIG. 3, the thread scheduler 102 comprises a plurality of components 304 such as component 304-1, 304-2, . . . 304-S. A component 304-$i$, hereinafter referred to as a first component, schedules a set of threads of a first node of a first stage, also referred to herein as a first set of threads, to a first processor 306. The component 304-$i$ represents an i-th component, such that "i" may be any one of 1, 2, . . . S, of the components 304 of the thread scheduler 102. The first set of threads include a predetermined number of threads of the first node required to generate a data unit for one or more child nodes of the first node to consume. The first processor 306 may be any one of the processor array 104 and the accelerator processor 106 that is configured to execute threads of a first stage or a parent stage of the graph. Another component 304-$j$, hereinafter referred to as a second component, schedules a set of threads of a plurality of second nodes of a second stage to a second processor 308. The component 304-$j$ represents a j-th component, such that "j" may be any one of 1, 2, . . . S, of the components 304, other than the i-th component of the thread scheduler 102, i.e., j≠i. The second processor 308 may be any one of the processor array 104 and the accelerator processor 106 that is configured to execute threads of a second stage or a child stage of the graph. In some embodiments, the first processor 306 may be the processor array 104 and the second processor 308 may be the accelerator processor 106. In another embodiment, the first processor 306 may be the accelerator processor 106 and the second processor 308 may be the processor array 104.

The first component 304-$i$ may be any of the components 304-1, 304-2, . . . 304-S. In one embodiment, the first component 304-$i$ also schedules a set of threads of a first stage to the first processor 306. The first stage may be any parent stage of the graph such as, but not limited to, the stage 1, stage 2 or stage 3 of the graph 200. The first node may be any node of the first stage. The predetermined number of threads in a set of threads is same for all nodes across a graph, but differs for different graphs. For example, for a graph, the first set of threads may be 4 threads and for another graph, the first set of threads may be 2 threads.

The second component 304-$j$ may be any of the components 304-1, 304-2, . . . 304-S other than the first component 304-$i$. In one embodiment, the second component 304-$j$ also schedules a set of threads of a second stage, also referred to herein as a second set of threads, to the second processor 308. The second stage may be any child stage of the graph such as, but not limited to, the stage 2 or stage 3 or stage 4 of the graph 200. The second node may be any node of the second stage. The second set of threads include a predetermined number of threads of the second node or a plurality of second nodes required to consume the data unit generated by the first node or the first stage. The predetermined number of threads in a set of threads is same for all nodes across a graph, but differs for different graphs. For example, for a graph, the second set of threads may be 4 threads and for another graph, the second set of threads may be 2 threads.

The components 304 are coupled with a plurality of command buffers 310 located in the main memory 110 to extract a set of thread commands generated by the processors upon execution of threads. Each component 304-1, 304-2, . . . 304-S is associated with each command buffer 310-1, 310-2, . . . 310-S respectively.

Each first component 304-$i$ schedules a set of threads of a first node or a first stage to the first processor 306. The first component 304-$i$ initializes a status of a completion pointer 312 upon scheduling the first set of threads to the first processor 306. The completion pointer 312 corresponds to the command buffer 310-$i$ indicating a set of threads that have completed execution by the first processor 306. The first component 304-$i$ receives thread retire events, from the first processor 306, indicating completion of execution of the first set of threads by the first processor 306 and generation of at least one data unit.

The thread retire events comprise a set of thread commands, corresponding to the first set of threads, required to generate threads for a second node or a second stage. In one embodiment, the set of thread commands include a data pointer pointing to a memory where the data unit is stored. The first component 304-$i$ retrieves the set of thread commands from the thread retire events and writes them into the command buffer 310-$i$. The command buffer 310-$i$ is configured to temporarily store the set of thread commands emitted by the first node or first stage and discard the thread commands once consumed by the second processor 308. The command buffer 310-$i$ updates the status of the completion pointer 312 upon writing the set of thread commands into the command buffer 310-$i$ to an updated value. The updated value indicates execution of threads by the first processor 306 and availability of data unit required to execute the threads of the second node or the second stage. In some embodiments, the completion pointer 312 may store and update status of a plurality of completion pointers 312 associated with each component 304-1, . . . , 304-S.

Each second component 304-$j$ reads the status of the completion pointer 312 and determines if the status indicates at least one set of threads of the first node have completed execution. The second component 304-$j$ further schedules a set of threads of the second node or the second stage of the graph. The second stage may be a child stage and the second node may be any node of the second stage. The second component 304-$j$ initializes a status of a free pointer 314 corresponding to the command buffer 310-$i$. The status of the free pointer 314 indicates availability of free memory space in the command buffer 310-$i$ to store at least one set of threads emitted by the first node or the first stage, the threads of which need to be scheduled by the first component 304-*i*. The second component 304-*j* receives thread retire events from the second processor 308 and updates the status of the free pointer 314. The first component 304-*i* further reads the status of the free pointer 314 and schedules further sets of threads of the first node to the first processor 306 based on the status of the free pointer 314. In some embodiments, the free pointer 314 may store and updated status of a plurality of free pointers 314 associated with each component 304-1, . . . 304-S. A detailed explanation of the management of the command buffers 310 by the thread scheduler 102 is explained further below with the help of FIGS. 6 and 7.

FIG. 4 illustrates an architecture of an accelerator processor of FIG. 1 in accordance with some embodiments of the present disclosure.

The accelerator processor 106 comprises a processor 404, a memory 406 and one or more modules 408 to perform operations associated with neural networks. The processor 404 may be a general-purpose processor, an array of processors, an application specific processor, a field programmable gate array and the like. The memory 406 may be a volatile memory or a non-volatile memory. The memory 406 comprises at least the private data buffer 402 and a parameters buffer 409. The one or more modules 408 may comprise a thread execution control unit 410, an activation write unit 412, a parameter prefetch unit 414, fixed function modules 416 and activation store unit 418. In some embodiments, the processor 404 may comprise the modules 408.

The thread execution control unit 410 is configured to execute a set of threads dispatched by the thread scheduler 102 to the accelerator processor 106 and send thread retire events to the thread scheduler 102. The thread execution control unit 410 may be interfaced with the thread scheduler 102 for receiving the one or more threads dispatched to the accelerator processor 106 and initiates processing of the one or more threads. The thread execution control unit 410 may be coupled with the private data buffer 402 for initiating the processing of the threads. The thread execution control unit 410 tracks execution status of each thread of the threads. The thread execution status may be any of fetching input data, execution, writing the output data and the like. The thread execution control unit 410 determines that execution status of a set of threads is completed and sends thread retire event to the thread scheduler 102 indicating the completion of thread execution.

In some embodiments, the accelerator processor 106 receives threads for execution that are dependent on the execution of parent thread by the processor array 104. In such cases, the activation write unit 412 is coupled with the processor array 104 for enabling processor array 104 to write data into the private data buffer 402. The private data buffer 402 may comprise one or more three-dimensional buffers to store data generated by the processor array 104 or the accelerator processor 106. In an embodiment, each three-dimensional buffer, also referred herein as an activation data buffer, comprises a portion of memory for storing one or more outputs generated by the accelerator processor 106 or the processor array 104. Each activation data buffer may store the outputs generated in the form of slices. In one example, each slice may be 8 rows in height and 8 planes in depth, such as 8 rows of pixels. Each slice may be represented as a plurality of chunks, which is further represented as a number of blocks. A detailed analysis of storing each data unit in the private data buffer 402 is discussed in detail with the help of FIG. 5*a* below.

Figure 5A:
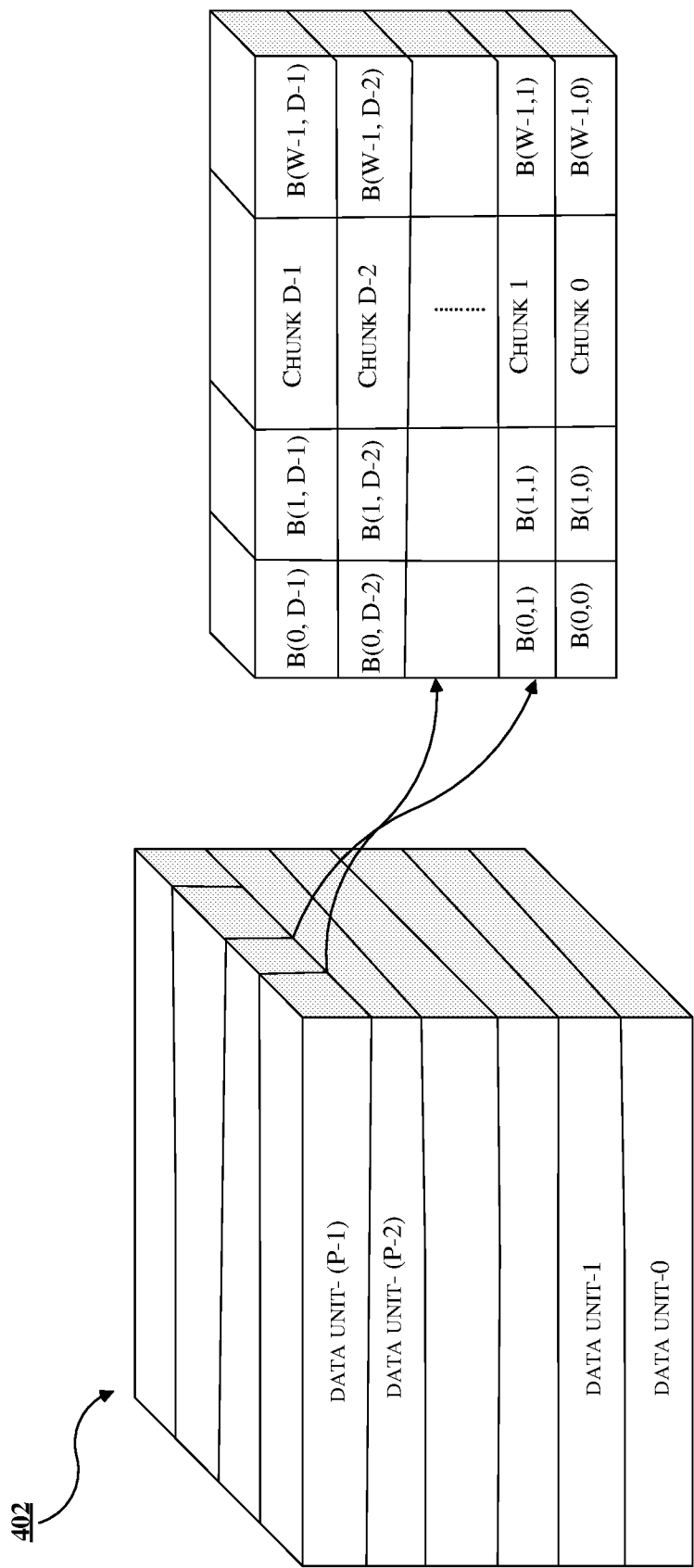
FIG. 5a illustrates a decomposed view of a private data buffer of FIG. 4 in accordance with an embodiment of the present disclosure.

FIG. 5*a* illustrates a decomposed view of the private data buffer of FIG. 4 in accordance with an embodiment of the present disclosure.

402. The private data buffer 402 comprises a plurality of data units data unit-0, data unit-1, . . . data unit (P−2) and data unit (P−1), where P may be a maximum number of data units that can be stored within the private data buffer 402. Each data unit may be decomposed into a plurality of chunks chunk-0, chunk-1, . . . chunk (D−2) and chunk (D−1), where D is a depth of the private data buffer 402 and represents a total number of chunks present within each data unit. Each chunk may further be decomposed into a plurality of blocks for example, B(0,0), B(1,0), . . . B(W−1, 0) in chunk-0. Here, 'W' may indicate a plurality of parameters or weights required to calculate a chunk of output data. In some embodiments, there may be a plurality of private data buffers 402 in the memory 406 for implementing an input data buffer and an output data buffer for each pair of a parent stage and a child stage of the graph.

The activation write unit 412 receives data, such as a data unit from the processor array 104 and writes the data into the private data buffer 402. The activation write unit 412 may receive the data upon execution of a thread by the processor array 104. The processor array 104 may execute a thread and may generate an output data comprising at least one data unit. The processor array 104 determine that a subsequent thread dependent on the executed thread is mapped to the accelerator processor 106, for example, based on the output states. The processor array 104 may then write the generated output data into the private data buffer 402 of the accelerator processor 106 through the activation write unit 412, instead of writing into the shared memory 108. When the accelerator processor 106 executes the subsequent thread, the accelerator processor 106 may fetch the generated output data from the private data buffer 402, thereby consuming less time as compared to fetching from the shared memory 108 which consumes more time. Thus, the activation write unit 412 optimizes the time required for the accelerator processor 106 to fetch data from the shared memory 108 by enabling processor array 104 to write data into the private data buffer 402.

The parameter prefetch unit 414 may receive a thread initiation instruction of a thread from the thread execution control unit 410 and fetch states from the main memory 110 required for execution of the thread. The parameter prefetch unit 414 may be interfaced with the shared memory 108 with read interfaces to read one or more parameters including such as weights, biases and scales associated with one or more neural network operations related to the thread. The parameter prefetch unit 414 retrieves states of the parameters and the parameters required to execute the thread from the main memory 110. The parameter prefetch unit 414 is coupled with the parameters buffer 409, stored in memory 406. The parameter prefetch unit 414 writes the parameters fetched from the main memory 110 into the parameters buffer 409. The parameters buffer 409 is a circular buffer of a predetermined size. The predetermined size may be determined based on a depth of the private data buffer 402 and a depth of an input chunk.

Figure 5B:
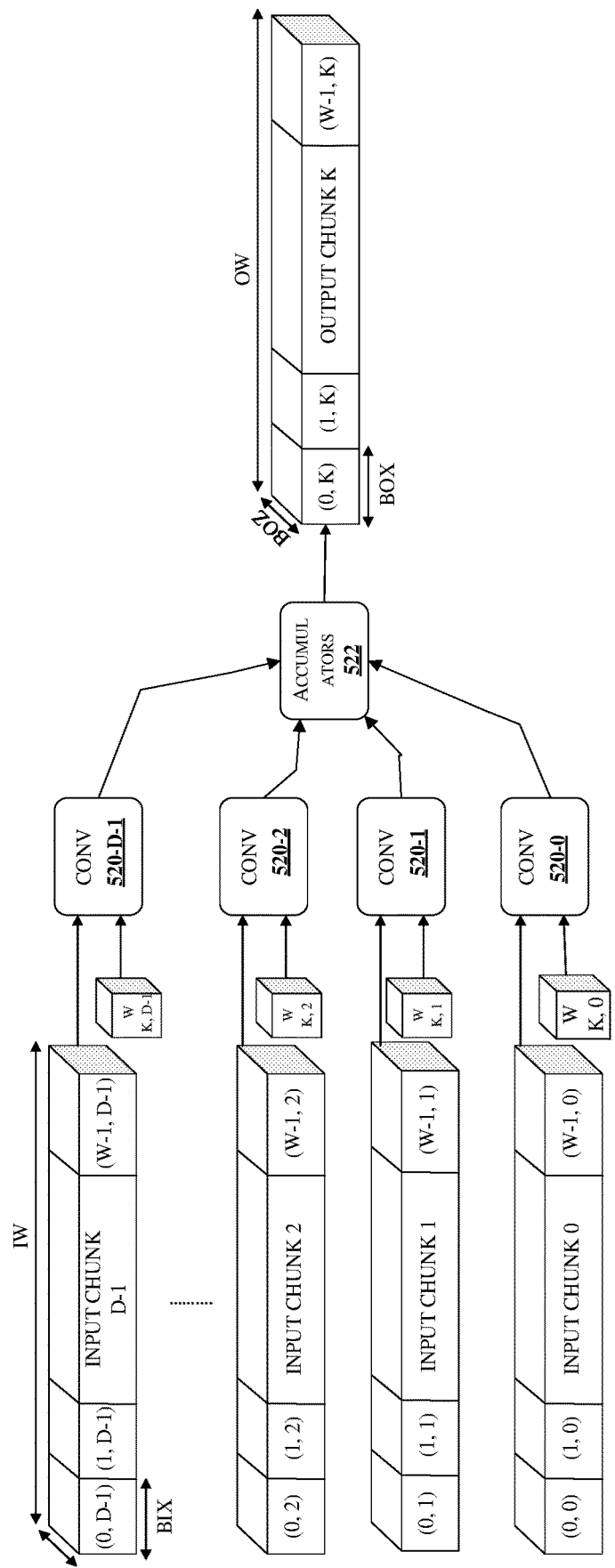
FIG. 5b illustrates the operation of fixed function modules of the accelerator processor in accordance with embodiments of the present disclosure.

The parameter prefetch unit 414 may determine if all the parameters required to generate an output chunk of data have been fetched and also determine if there is still memory space available in the parameters buffer 409 to store further parameters required to generate further chunks of data. The parameter prefetch unit 414 may prefetch other parameters required to generate a further chunk of output data and store into the parameters buffer 409. The parameters buffer 409 may be coupled with the vector convolution datapath units for execution of the thread. For example, as shown in FIG. 5b, the parameters buffer 409 may store the parameters $W_{k,0}$ to $W_{k,D-1}$ required to generate an output chunk-k of data. In this example, the parameters buffer 409 discards the parameters $W_{k,0}$ to $W_{k,D-1}$ once the output chunk-k is generated. The parameter prefetch unit 414 may prefetch $W_{k+1,0}$ to $W_{k+1,D-1}$ parameters required to generate a further output chunk-(k+1) of data during the generation of the output chunk-k and when a required amount of memory to store the $W_{k+1,0}$ to $W_{k+1,D-1}$ parameters is available in the parameters buffer 409.

The fixed function modules 416 may comprise activation multiplexers, vector convolution data path units, accumulators, and a quantization and second stage operations unit.

The activation multiplexers of the fixed function modules 416, also referred herein as activation MUXes, may generate one or more blocks of input data required to perform one or more neural network operations. The activation MUXes may be implemented using hardware multiplexers or in software. The activation MUXes receive input data required for the one or more neural network operations such as one or more data units of image from the private data buffer 402. The activation MUXes generate input data required for vector convolution datapath units for the one or more neural network operations such as chunks of data. In one embodiment, the activation MUXes may generate a chunk of data or an input chunk required for the one or more neural network operations. In another example, the activation MUXes generate a block of 8×10×10 pixels as input data for 4×4 convolution operation. In another example, the activation MUXes generate a block of 8×17×17 pixels as input data for 4×4 convolution stride 2 operation. In yet another example, the activation MUXes generate a block of 42×8×8 pixels as input data for 1×1 convolution operation.

The vector convolution datapath units may receive the input data generated by the activation MUXes, a plurality of weights from the parameters buffer 409 and may perform the one or more neural network operations. In one embodiment, the vector convolution datapath units, also referred herein as convolution units, may receive a block of input data from the activation MUXes, a block of weights, may perform convolution dot product operations and may generate a block or a plurality of blocks of output data. The operation of the convolution units may be herein explained using the FIG. 5b below.

FIG. 5b illustrates the operation of fixed function modules of the accelerator processor in accordance with embodiments of the present disclosure.

As shown in FIG. 5b, the convolution units 520-0, 520-1, 520-2, . . . 520-(D−1), together represented as the convolution units 520. The input chunks, namely input chunk-0, input chunk-1, input chunk-2, . . . input chunk (D−1), represent the input data generated by the activation MUXes. Each input chunk may comprise "W" blocks from 0 to W−1. Each block is of a length of BIX, and depth of BIZ, where BIX and BIZ are any number of pixels. The parameters $W_{k,0}$, $W_{k,1}$ . . . , $W_{k,D-1}$ may represent the plurality of weights retrieved from the parameters buffer 409. Each convolution unit 520-0, 520-1, . . . , 520-(D−1) may receive the input chunks input chunk-0, input chunk-1, . . . input chunk-(D−1), and the weights $W_{k,0}$, $W_{k,1}$ . . . , $W_{k,D-1}$ and performs convolution operations as shown in FIG. 5b to generate an output chunk-k. For example, a block of the input chunk-0 is convolved with the weight $W_{k,0}$ by the convolution unit 520-0, a block of input chunk-1 is convolved with weight $W_{k,0}$ by the convolution unit 520-1, . . . and a block of the input chunk-(D−1) is convolved with the weight $W_{k,D-1}$ by convolution unit 520-(D−1) to generate a block of an output chunk-k. Each block of the output chunk-k is of length BOX, and a depth of BOZ.

Referring back to FIG. 4, in an embodiment, the convolution units may operate in a 4×4 convolution mode when the neural network operation is the 4×4 convolution operation. In this mode, the accelerator processor 106 may comprise at least four convolution units, where each convolution unit receives a block of activation data, a block of weights and performs the 4×4 convolution operation to generate partial output activation data. For example, in this mode, each convolution unit may receive 8×4×10 input data, 16×8×4×4 blocks of weights and generates 16×2×8 partial output data.

In another embodiment, the convolution units may operate in 4×4 convolution stride 2 mode, wherein the accelerator processor 106 comprises at least four convolution units. In this embodiment, each convolution unit receives a block of activation data, a block of weights and performs the 4×4 convolution stride 2 operation to generate partial output activation data. For example, in this mode, each convolution unit may receive 8×6×17 input data, 16×8×4×4 blocks of weights and generates 16×2×8 partial output data. In a further embodiment, the convolution units may operate in 1×1 convolution mode, wherein the accelerator processor 106 comprises at least four convolution units. In this embodiment, each convolution unit receives a block of activation data, a block of weights and performs the 1×1 convolution operation to generate partial output activation data. For example, in this mode, each convolution unit receives 42×2×8 input data, 42×42×1×1 blocks of weights and generates 42×2×8 partial output activation data. In some embodiments, the convolution units may require at least three data units of input data to execute a thread and generate at least an output data unit.

The accumulators 522 may receive the partial output data from the convolution units and may accumulate them to generate an output block of data. For example, as shown in FIG. 5b, the accumulators 522 may receive outputs from the convolution units 520-0 . . . 520-(D−1) and accumulate the outputs of all the convolution units 520 to generate the output block-(0.0). The accumulators 522 may be an accumulation unit configured within a processor to accumulate data.

The quantization and second stage operations unit may receive the output block from the accumulators and may perform second stage operations on the output block. The second stage operations include, but not limited to, batch normalization, rectified linear unit, leaky rectified linear unit, and binary summation. In some embodiments, the second stage operations may also be referred to as node fusion operations, since convolution nodes such as 1×1 convolution, 4×4 convolution and 4×4 convolution stride 2 operation, are fused with the nodes associated with second stage operations and may perform the operations on the output data from the convolution nodes. The quantization and second stage operations unit may be any processor such as a general-purpose processor, Application Specific Integrated Chip (ASIC), Field Programmable Gate Array (FPGA), a microcontroller or a microprocessor configured to perform the second stage operations.

The activation store unit 418 may receive the output data, for example, a block, from the quantization and second stage operations unit and may store the output data in the private data buffer 402 or the shared memory 108 or both based on the output states of the current thread. Thus, the activation store unit 418 enables the accelerator processor 106 to access data from the private data buffer 402 rather than fetching input data from the memory subsystem thus reducing the time required for the accelerator processor 106 to fetch data from the shared memory 108.

In operation, the accelerator processor 106 may receive a thread, corresponding to a current node, for example, 202, dispatched by the thread scheduler 102. The thread execution control unit 410 may receive the thread and may initiate execution of the thread. The thread execution control unit 410 may communicate with the parameter prefetch unit 414 to fetch a plurality of weights from the main memory 110 and store in the parameters buffer 409. The thread execution control unit 410 may communicate with the private data buffer 402 to fetch input data required to execute the thread. The parameter prefetch unit 414 may then fetch weights from the parameters buffer 409 to execute the thread. The activation MUXes may receive input data from the private data buffer 402 and may generate a predetermined number of chunks of data required for the convolution units to execute the thread.

The convolution units may receive the predetermined number of chunks of data from the activation MUXes and weights from the parameters buffer 409 to perform one or more operations such as 1×1 convolution operation associated with the thread. The convolution units may generate partial output data that is received by the accumulators to accumulate a block of output chunk. The quantization and second stage operations unit receives the block of data accumulated by the accumulators and performs one or more second stage operations on the output block of data. The activation store unit 418 receives this output block of data and may store either in the shared memory 108 or the private data buffer 402 or both based on the output states. The thread execution control unit 410 may determine that the status of the thread is "writing results" and may wait till the status is "complete". The convolution units continue to generate further plurality of blocks of data to generate an output chunk and further an output data unit. The thread execution control unit 410 may determine at this stage that the status of the thread is complete since an output data unit has been generated by the accelerator processor 106. The thread execution control unit 410 may generate thread retire event for the current thread and may communicate the thread retire event of the current thread to the thread scheduler 102.

Figure 6A:
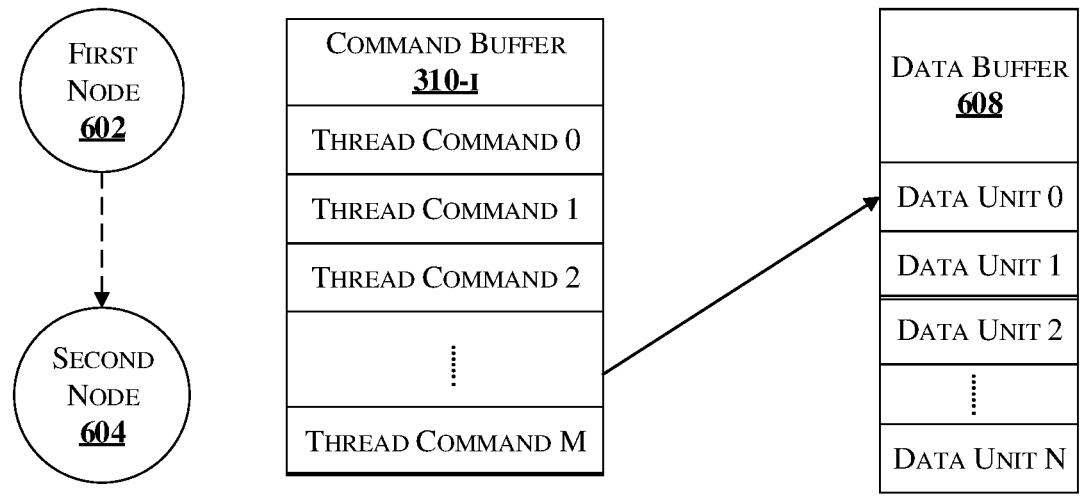
Figure 6B:
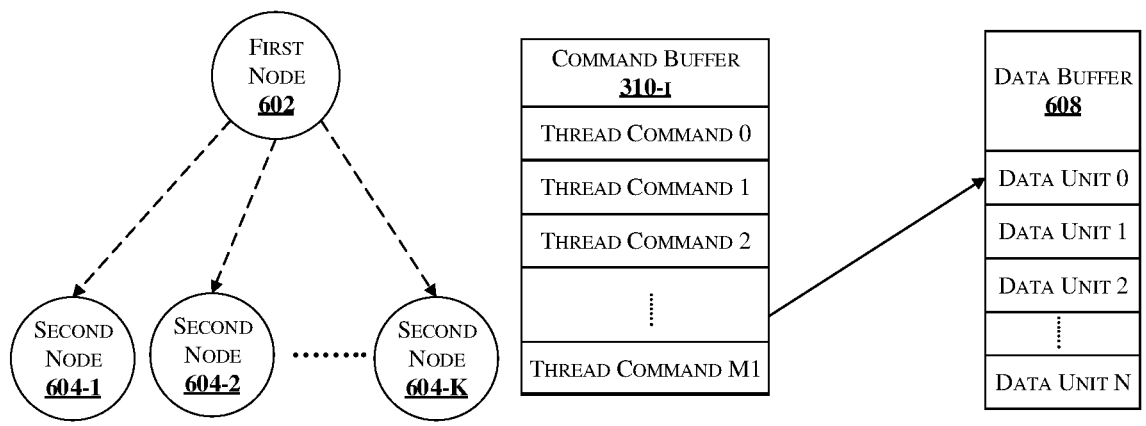

FIGS. 6a, 6b and 6c each illustrate an operation associated with the command buffer 310-i and the private data buffer 402 in accordance with some embodiments of the present disclosure.

As illustrated in FIG. 6a, the private data buffer 402, herein referred as data buffer 402, and the command buffer 310-i may be associated with a pair of a parent node and a child node of the graph. The data buffer 402 may be an output data buffer for the parent node to store data generated by executing the threads or the set of threads of the parent node. The data buffer 402 may be an input data buffer for the child node wherein the threads of the child node receive input stored in the data buffer 402 as input to execute threads or a set of threads of the child node.

In some embodiments, the command buffer 310-i and the data buffer 402 may be associated with a first node and a plurality of second nodes 604-1, 604-2, . . . 604-K as illustrated in FIG. 6b. In some other embodiments, there may be a number of first nodes 602-1, 602-2, . . . 602-L each of which acts as a parent node to a number of second nodes 604-1, 604-2, . . . 604-N. In these embodiments, there may be a plurality of data buffers 402-1, 402-2, . . . 402-L each associated with each first node 602-1, 602-2, . . . 602-L.

The first processor 304 executes threads of the first node 602 and writes output data, generated upon execution, into the data buffer 402. The second processor 306 reads the data from the data buffer 402, that has been generated by the execution of threads of the first node 602, as input for execution. The size of the data buffer 402 may be a predetermined value that may depend on a number of data units required to execute a thread or a set of threads of the second node. While the thread scheduler 102 dispatches threads of the first node 602 and second node 604 in parallel, there may be a possibility to overwrite the data in the data buffer 402 even before the threads of the second node 604 consume the data. Hence, it is imperative to avoid overwriting of data into the data buffer 402 even before the data is consumed by the second node or a plurality of second nodes 604.

The data buffer 402 may comprise a plurality of data buffers to store output data units generated by plurality of nodes 200 of FIG. 2. Each node of the graph may be associated with at least one input data buffer and at least one output data buffer. In some embodiments, the output data buffer of a node may serve as an input data buffer of another node. For example, the output data buffer of node 202 may serve as input data buffer of nodes 204, 205 and 207. In some other embodiments, a node may correspond to a plurality of input data buffers. For example, the node 207 may be associated with two input data buffers such as the output data buffer of node 202 and the output data buffer of node 204. Each node upon execution of a thread corresponding to the node may receive input data from the input data buffer associated with the node and may write output data into the output data buffer associated with the node.

The data buffer 402 of the first node 602 may serve as an input data buffer of the second node 604. The data buffer 402 that stores the output data units of the first node 602 may be referred to as a data buffer 608, which enables wrapping or segregating of data units upon consumption of data units by the second node 604. To avoid any overwriting of data in the data buffer 608, an optimal utilization of command buffers 310 has been proposed. An optimal size of each command buffer (M) 310-i may be chosen to be dependent on a number of threads of the first node 602 required to generate one data unit, $T_{min}$, a number of second nodes 604 (FIG. 6a) or 604-1, . . . 604-K (FIG. 6b) (K) dependent on the first node 602 and a minimum number of data units, $D_{min}$, required as input to execute a set of thread commands of each second node 604, calculated by M1=$T_{min}$*K*$D_{min}$. In some embodiments where there are a plurality of first nodes 602-1, 602-2, . . . 602-1 as shown in FIG. 6c, the size M2 of the command buffer 310-i of the first stage may be computed as a sum of the command buffer sizes calculated for each first node according to the above formula as illustrated below in equation (1).

$$M2 = T_{min1} * K_1 * D_{min1} + T_{min2} * K_2 * D_{min2} + \ldots + T_{minL} * K_L * D_{minL} \quad (1)$$

For example, when L=2, if $T_{min1}$ is "2", K is "2" and $D_{min1}$ is 1 for a first node 602-1 and if $T_{min2}$ is "2", K is "2" and $D_{min2}$ is 2 for a first node 602-1, M=2*2*1+2*2*2=12 thread commands. Thus, in this example, the size of the command buffer 310 is 12 thread commands of memory. The thread scheduler 102 embeds, within the first set of threads, information or a data pointer that points to the data buffer 608 to store a data unit that is generated after execution of the first set of threads and schedules the first set of threads to the first processor 306. The first processor 306 receives the first set of threads, executes the first set of threads, generates a data unit and stores the data unit in the data buffer 608 indicated by the data pointer embedded within the first set of threads. The first processor 306 generates thread retire events comprising a set of thread commands and emits or sends the thread retire events to the thread scheduler 102. The set of thread commands correspond to the first set of threads, and are required to generate threads for a second node or a second stage. In one embodiment, the set of thread commands corresponding to the set of threads is same as the set of threads. For example, 4 thread commands correspond to 4 threads of the first node. In one embodiment, the set of thread commands include a data pointer pointing to a memory where the data unit is stored. The first component 304-*i* extracts the set of thread commands from the thread retire events and writes the set of thread commands into the command buffer 310-*i*. The command buffer 310-*i* temporarily stores the set of thread commands and discards them once consumed by the second processor 308.

The thread scheduler 102 reads thread commands written into the command buffer 310, parses and extracts the data pointer pointing to the data unit. The thread scheduler 102 embeds the data pointer in a set of threads of the second node and schedules the set of threads of the second node to the second processor 308. The second processor 308 may execute the set of threads of the second node 604, using the data pointer that points to a memory space within the data buffer 608. The second processor 308 may thus read the data unit from the data buffer 608 indirectly using the data pointer embedded within the set of threads of the second node 604 and execute the set of threads of the second node 604. Further, the second processor 308 sends thread retire events to the thread scheduler 102 which indicates that the threads have been read by the second processor 308.

Further, if the thread scheduler 102 dispatches threads of the first node 602 and the second node 604 continuously, there may be a possibility of overwriting the command buffer 310 without the second node or the second stage 604 reading them. This may further result in data loss or overwriting in the data buffer 608. It is an objective of the disclosure to avoid such loss of information and avoid any overwriting. To achieve the objective, the present disclosure proposes a design and a management method of command buffer 310 as explained in detail below.

Referring back to FIG. 3, the thread scheduler 102 includes a number of components to schedule threads of the first node 602 and at least one second node 604 to the first processor 306 and the second processor 308. The design and management method may be explained using the example of FIG. 6*a* for simplicity and clarity. Further, similar method can be applied for embodiments illustrated in FIG. 6*b* and FIG. 6*c* in a similar manner. However, the examples shown in FIGS. 6*a*, 6*b* and 6*c* are only illustrated to explain the aspects of the present disclosure but are not limited in any manner. The aspects of the present disclosure may be implemented for a variety of other examples of graph without limitation.

The first component 304-*i* dispatches the first set of threads to the first processor 306. The command buffer 310-*i* may act as an output command buffer for the first node 602 and an input command buffer for the second node 604. The thread scheduler 102 may initialize and update a plurality of pointers associated with the command buffers 310 to enable command buffer operations. The first component 304-*i* may initialize a status of the completion pointer 312 and store in the memory 302 of the thread scheduler 102. The completion pointer 312 may be a memory space to store a value that indicates a number of threads that have completed execution by the first processor 306 and is associated with the command buffer 310-*i*. In some embodiments, the completion pointer 312 may be a plurality of memory spaces each associated with each command buffer 310. The first component 304-*i* initializes the completion pointer 312 during execution of threads of the first node to an initial value. The initial value indicates the first set of threads that have been just dispatched, but have not completed execution. In one example, if the first component 304-*i* dispatches a first set of threads of the root node 201 of the graph 200, the first component 304-*i* initializes the completion pointer to "0".

The first component 304-*i* further receives thread retire events from the first processor 306. The thread retire events include thread commands required to generate threads for one or more second nodes 604 and a data pointer indicating the location of the data unit in the memory of the first processor 306 or the shared memory 108. The location of the data unit may be in the memory of the first processor 306 if the first processor 306 is the accelerator processor 106. The location of the data unit may be in the shared memory if the first processor 306 is the processor array 104. The thread retire events indicate that the first processor 306 has completed execution of the scheduled set of threads and that a data unit has been generated upon execution. Thus, the first component 304-*i* detects the execution of the scheduled first set of threads 602 and a generation of at least one data unit. The first component 304-*i* updates the status of the completion pointer 312 to an updated value in response to generation of the data unit. The status of the completion pointer 312 indicates a number of thread commands emitted by the first node 602 stored in the command buffer 310-*i* upon execution of at least one set of threads of the first node 602 and a number of data units generated by the first node 602 and stored in the data buffer 608.

In some embodiments, a plurality of first components 304-I may be associated with a plurality of first nodes of the first stage for example, as shown in FIG. 6C. In these embodiments, the plurality of first components 304-I schedule threads of the plurality of first nodes to the first processor 304 and receive the thread retire events from the first processor 304 or a plurality of processors. The plurality of first components 304-I write the thread commands into the command buffer 310-*i* upon receiving thread retire events corresponding to all first nodes of the first stage.

The second component 304-*j* refers to the updated status of the completion pointer 312 and determines that there is enough data for a thread of a plurality of second nodes of a second stage to consume. For the sake of clarity, the working of the second component 304-*j* is exemplified using only one second node while the second component 304-*j* may determine and schedule threads of a plurality of second nodes of the second stage. The second component 304-*j* receives the set of thread commands from the command buffer 310-*i* based on the status of the completion pointer. The second component 304-*j* extracts a data pointer of the data unit stored in the data buffer 608 from the set of thread commands. The second component 304-*j* generates a second set of threads of the second node or a plurality of nodes in the second stage comprising the data pointer of the data unit. The second component 304-*j* schedules the second set of threads of the second node dependent on the first node, or a child node of the first node, to the second processor 308. In one embodiment, the second component 304-*j* schedules the second set of threads of the second stage to the second processor 308. The second set of threads include a predetermined number of threads that consume the data unit generated by the first set of threads. In one embodiment, the predetermined number may be one.

The second component 304-j initializes a status of the free pointer 314 to an initial value while dispatching the second set threads of the second node 604 to the second processor 308. The free pointer indicates availability of free space in the command buffer 310-i to store at least one set of thread commands emitted by the first node or the first stage. The free pointer indicates whether any threads of first node can be dispatched to the first processor 306.

The initial status of the free pointer 314 indicates that the set of thread commands in the command buffer 310-i have not yet been read by the second processor 308. In one embodiment, the initial status of the free pointer 314 indicates that there is no free space available in the command buffer 310-i for storing at least one set of thread commands emitted by the first node. The second component 304-j receives thread retire events from the second processor 308 indicating the second processor 308 has completed executing the scheduled threads. The thread retire events indicate that the second processor 308 has read the set of thread commands stored in the command buffer 310-i, parsed the threads and retrieved a data pointer pointing to a memory where the generated data unit has been stored. The thread retire events also indicate that the second processor 308 has consumed the stored data unit and executed the scheduled set of threads. Thus, the second component 304-j detects that the second set of threads of the second node 604 have been executed by consuming the data unit. The second component 304-j further updates the status of the free pointer 314 to an updated value indicating the stored set of thread commands in the command buffer 310-i have been read by the second node and hence can be discarded from the command buffer 310-i. The updated status of the free pointer 314 indicates that there is a free space available in the command buffer 310-i for scheduling subsequent set of threads of the first node to the first processor 306 and store them in the command buffer 310-i.

Thus, the thread scheduler 102 updates the status of the completion pointer 312 and the free pointer 314 based on the execution of "set of threads" unlike "a number of threads" or a number of "data units" generated or consumed. This helps in enhancing data tracking and availability in the data buffer 608 which avoids overwriting of data in the data buffer 608 as well as the command buffer 310. Further, this also enables efficient scheduling of threads by the thread scheduler 102 by reducing early dispatching of threads of second node before sufficient data availability or early dispatch of threads of the first node that results in overwriting of data in the data buffer 608 and command buffer 310.

FIGS. 7a-7f illustrates an example of the command buffer 310-i and the data buffer 402, 608 in accordance with the embodiments of the present disclosure.

Consider a part of a graph comprising two nodes-first node 702 and a second node 704 dependent on the first node 702. Further, consider the first set of threads 702 required to generate at least one data unit is "4" and a number of data units required to execute a set of threads of the second node 704 is "2". Thus, the size of a command buffer 706 associated with the first node 702 and the second node 704 would be a memory space in the main memory 110 to store "8" thread commands. Further, the data buffer 402, 608, referred herein as a data buffer 708, associated with the first node 702 and the second node 704 may comprise a memory space to store 3 data units. FIGS. 7a-7f indicate different stages of execution of the graph.

During an initial stage, the status of the completion pointer "CP" indicates "0", such as may point to the first memory slot "Tcmd 0" (not shown) which means that none of the thread commands have been generated. The initial stage may indicate a stage where the first component 304-i has just scheduled a set of threads to the first processor 304, but has not yet received thread retire events from the first processor 304. The free pointer "FP" has also been initialized by the thread scheduler 102 to point at the end of the command buffer 706 which indicates free space is available in the command buffer 706 to schedule a first set of threads 702.

FIG. 7a illustrates a first stage of the execution where the first component 304-i of the thread scheduler 102 has received thread retire events, indicating execution of a set of threads, comprising a set of thread commands Tcmd 0, Tcmd 1, Tcmd 2 and Tcmd 3 of the first node 702 from the first processor 306. The first node 702 and the set of thread commands have been indicated in "grey" to indicate the operation. Further, the thread scheduler 102 has updated the initial status of the CP to indicate completing execution of "the first set of threads" and updates the status of CP to "Tcmd 3" and generating a data unit "data unit 0".

FIG. 7b illustrates a second stage of the execution where the thread scheduler 102 may further schedule another set of threads based on the status of the free pointer indicating availability of free space. The first component 304-i of the thread scheduler 102 dispatches the set of threads Tcmd 4, Tcmd 5, Tcmd 6, and Tcmd 7, highlighted in grey and a generation of a second data unit "data unit 1". The thread scheduler 102 also updates the status of CP indicating all the threads have completed execution.

FIG. 7c illustrates a third stage where the second component 304-j of the thread scheduler 102 schedules a set of threads of the second node 704 (highlighted in grey) to the second processor 308. The second set of threads of the second node have consumed the first data unit "Data unit 0" (indicated in white) for execution. The second node 704 has read the set of threads Tcmd 4, . . . . Tcmd 7, and also consumed data unit 1. Thus, the second component 304-j updates FP indicating all availability of free space in the command buffer 706. However, the data unit 1 needs to be retained so that it can be used as input in combination with data unit 2 for executing a subsequent set of threads of second node. The data unit 1 has been indicated as shared to illustrate this as against to (Crossed line shading in FIG. 7B).

FIG. 7d illustrates a fourth stage of execution where the first component 304-i of the thread scheduler 102 schedules further set of threads Tcmd 8, Tcmd 9, Tcmd 10, and Tcmd 11, which further produce another data unit "data unit 2". The thread scheduler 102 updates the status of the CP to Tcmd 11 indicating execution of the set of threads up to Tcmd 11.

FIG. 7e illustrates a fifth stage of execution where both the first component 304-i and 304-j schedule threads of the first node 702 and the second node 704 in parallel. The set of threads of the second node 704 have consumed the second data unit "data unit 1" (highlighted in "white") and data unit 2, while data unit 2 will be retained to be used by the next set of threads of the second node 704. The first component 304-i has scheduled further set of threads Tcmd 12, Tcmd 13, Tcmd 14, and Tcmd 15 which generates another data unit stored at "data unit 0". The thread scheduler 102 updates the status of the completion pointer CP to "Tcmd 15" indicating all threads within the command buffer 706 have been executed. The thread scheduler 102 also has updated the status of the free pointer to Tcmd 11 indicating free space available in the command buffer 706.

FIG. 7f illustrates a sixth stage of execution where the second component 304-j schedules a further set of threads of the second node 704 based on the updated value of the completion pointer. The set of threads of the second node 704 consume the third data unit "data unit 2" and fourth data unit data unit 0, while data unit 0 is retained to be used by next set of threads of second node 704. The thread scheduler 102 updates the status of the free pointer FP to "Tcmd 15" indicating the set of threads Tcmd 12-Tcmd 15 within the command buffer 706 have been read by the threads of the second node 704. The first component 304-i has also scheduled further set of threads Tcmd 16, . . . Tcmd 19 to the first processor 306, which upon execution have generated another data unit stored at "data unit 1". The thread scheduler 102 has also updated the completion pointer to Tcmd 19 indicating complete execution of the set of threads Tcmd 16, . . . , Tcmd 19.

Thus, the thread scheduler 102 controls scheduling the threads of the first node 702 and the second node 704 by updating the command buffer 706 and the statuses of the completion pointer 312 and the free pointer 314 associated with the command buffer 706, thereby avoiding overwriting of the data buffer 708.

Figure 8:
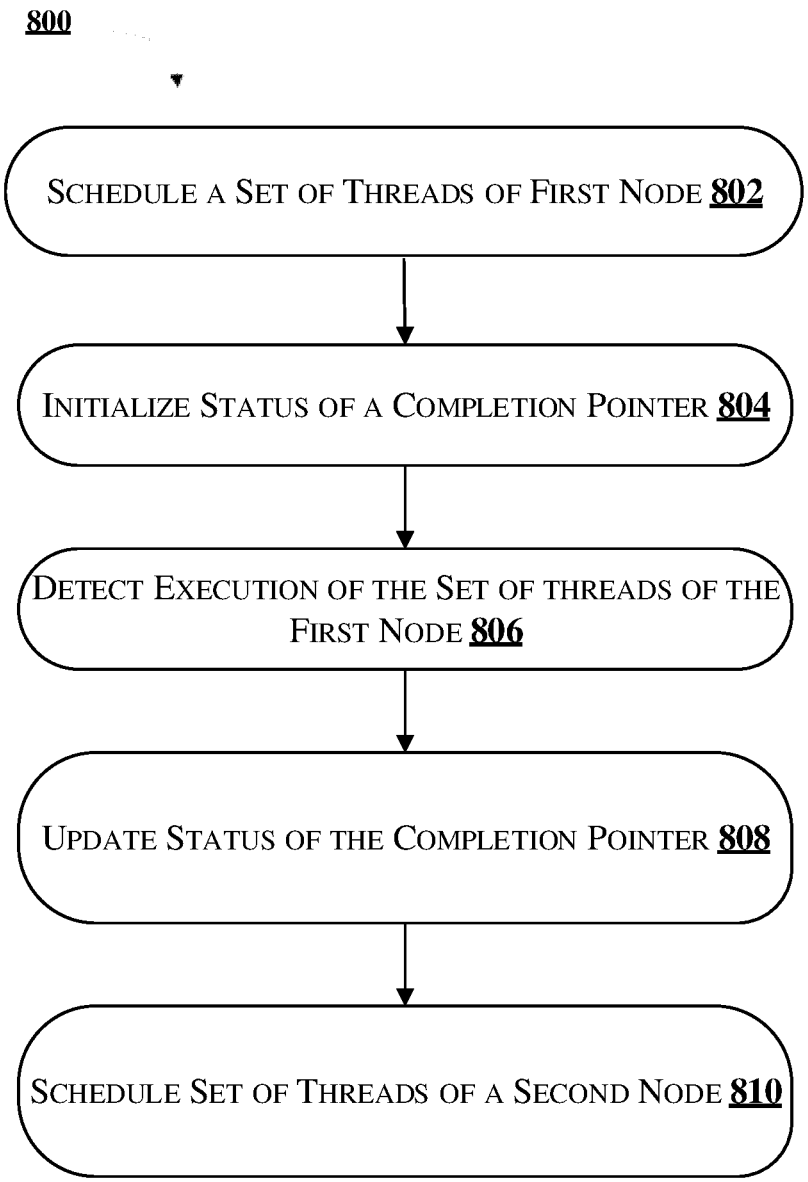
FIG. 8 illustrates a flowchart of a method performed by the thread scheduler to dispatch threads based on a status of a completion pointer associated with the command buffer in accordance with some embodiments of the present disclosure.

FIG. 8 illustrates a flowchart of a method performed by the thread scheduler 102 to dispatch threads based on the status of the completion pointer associated with the command buffer in accordance with some embodiments of the present disclosure.

As illustrated in FIG. 8, the method 800 comprises one or more blocks implemented by the thread scheduler 102 to dispatch threads of a graph. The method 800 may be described in the general context of computer executable instructions. Generally, computer executable instructions can include routines, programs, objects, components, data structures, procedures, modules, and functions, which perform specific functions or implement specific abstract data types.

The order in which the method 800 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 802, the first component 304-i of the thread scheduler 102 may schedule a first set of threads 602 of the graph to the first processor 306. The first processor 306 may be any processor such as the processor array 104 and the accelerator processor 106. A set of threads of the first node include a minimum number of threads of the first node 602 required to generate at least one data unit upon execution. The size of the command buffer may be computed based on a minimum number of threads ($T_{min}$) required to generate the data unit upon execution, a minimum number of data units ($D_{min}$) required to execute a set of threads of the second node, and wherein a size of the command buffer is based on $T_{min}$ of the first node, a number of the second nodes dependent on the first node and $D_{min}$.

At block 804, the first component 304-i of the thread scheduler 102 may initialize a status of the completion pointer 312. The completion pointer 312 is associated with the command buffer 310-i and may indicate a number of set of threads that have been executed by the first processor 306.

At block 806, the first component 304-i of the thread scheduler 102 detects execution of the first set of threads 602. The first component 304-i receives thread retire events from the first processor 306 indicating complete execution of the first set of threads 602. The thread retire events also indicate generation of the data unit and storage of the data unit within the data buffer 402.

At block 808, the first component 304-i of the thread scheduler 102 updates the status of the completion pointer 312 indicating complete execution of the first set of threads 602.

At block 810, the second component 304-j of the thread scheduler 102 schedules a set of threads of the second node 604 of the graph to the second processor 308. The second processor 308 may be any processor such as the processor array 104 and the accelerator processor 106. The second component 304-j detects the updated status of the completion pointer 312 indicating complete execution of the first set of threads 602 and schedules a set of threads of the second node 604. The set of threads of the second node 604 include a minimum number of threads of the second node 604 that consume one data unit.

The second component 304-j further initializes a status of the free pointer 314 to an initial value, wherein the free pointer 314 is associated with the command buffer 310-i. Further, the second component 304-j detects execution of the set of threads of the second node 604 based on thread retire events received from the second processor 308. The second component 304-j updates the status of free pointer 314 to an updated value indicating availability of free memory space in the command buffer 310-i required to store a set of thread commands generated by the first node 602. Further, all the above described methods can be applicable to a first stage and a second stage of a graph wherein the first stage and the second stage comprises a number of nodes.

Figure 9:
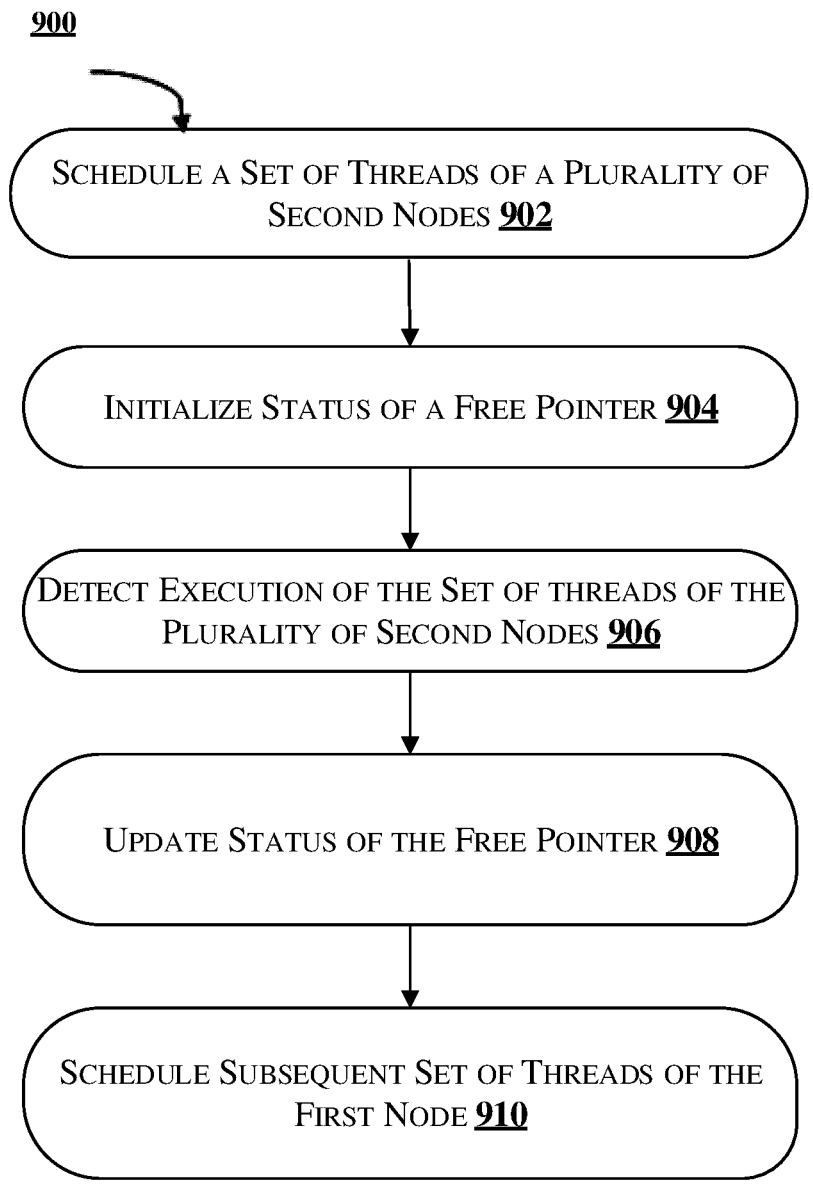
FIG. 9 illustrates a flowchart of a method performed by the thread scheduler to dispatch threads based on a status of a free pointer associated with the command buffer in accordance with some embodiments of the present disclosure.

FIG. 9 illustrates a flowchart of a method performed by the thread scheduler 102 to dispatch threads based on the status of the free pointer associated with the command buffer in accordance with some embodiments of the present disclosure.

As illustrated in FIG. 9, the method 900 comprises one or more blocks implemented by the thread scheduler 102 to dispatch threads of a graph. The method 900 may be described in the general context of computer executable instructions. Generally, computer executable instructions can include routines, programs, objects, components, data structures, procedures, modules, and functions, which perform specific functions or implement specific abstract data types.

The order in which the method 900 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 902, the second component 304-j of the thread scheduler 102 may generate and schedule a set of threads of the plurality of second nodes 604 of the graph to the second processor 308. The second processor 308 may include, without limiting to, the processor array 104 and the accelerator processor 106. The set of threads include a minimum number of threads of each of the plurality of second nodes 604 required to consume at least one data unit upon execution.

At block 904, the second component 304-*j* of the thread scheduler 102 may initialize a status of the free pointer 314. The free pointer 314 is associated with the command buffer 310-*i* and may indicate availability of free memory space in the command buffer 310-*i* to store at least one set of thread commands emitted by the first node or the first stage, whose threads need to be executed by the first component 304-*i*.

At block 906, the second component 304-*j* of the thread scheduler 102 detects execution of the set of threads of the plurality of second nodes 604. The second component 304-*j* receives thread retire events from the second processor 308 indicating complete execution of the set of threads of the plurality of second nodes 604. The thread retire events also indicate consumption of the data unit from the data buffer 402.

At block 908, the second component 304-*j* of the thread scheduler 102 updates the status of the free pointer 314 indicating complete execution of the set of threads of the plurality of second nodes 604.

At block 910, the first component 304-*i* of the thread scheduler 102 schedules a first set of threads 602 of the graph to the first processor 306. The first processor 306 may include any processor, without limiting to, the processor array 104 and the accelerator processor 106. The first component 304-*i* detects the updated status of the free pointer 314 indicating complete execution of the set of threads of the plurality of second nodes 604 and schedules the first set of threads 602. Further, all the above-described methods can be applicable to a first stage and a second stage of a graph, wherein the first stage and the second stage comprise a number of nodes.

Thus, the present disclosure provides a design and a management method of a command buffer associated with a parent stage and a child stage to enable parallel execution of the parent and child threads of the graph. Further, the disclosure provides methods that enable the thread scheduler to schedule threads in an efficient way to avoid any overwriting of data buffer or the command buffer by optimizing the use of the command buffer using pointers. The present disclosure provides a method of designing an optimum the command buffer size of a parent stage or a parent node based on a number of child nodes, a minimum number of data units required as input to execute a set of thread commands of each child node and a number of threads of the parent node required to generate a data unit. Such a command buffer size requires the thread scheduler to dispatch only a number of threads required to generate a number of data units less than that can be stored in the data buffer. For example, if the data buffer can store 3 data units, the command buffer size is chosen such that even if the command buffer is full, the threads of the command buffer can only generate 2 data units. Thus, the present disclosure enables the thread scheduler to dispatch only a minimum number of required threads of the parent stage to generate a minimum number of data units to be consumed by the child nodes/stage. Such an optimum command buffer size also enables the thread scheduler to optimally dispatch threads of second node to consume the data units in the data buffer well before the data units are overwritten by further data units generated.

The dynamic updating of the completion pointer and the free pointer by the thread scheduler enables the components of the thread scheduler to provide timely and subtle dispatch of parent stage threads and child stage threads which further contributes to more robust and accurate thread scheduling.

Also, the thread scheduler updates the completion pointer and the free pointer with a granularity of the data units rather than a granularity of threads. This reduces processing resources to update the completion pointer and the free pointer upon execution of each thread and at the same time enhances the thread scheduling only upon generation of a data unit or a consumption of a data unit.

Thus, the present disclosure achieves an optimized design of a graph streaming processing system with less memory requirements and more efficient memory usage of both the command buffer and the data buffer. The present disclosure also provides methods to design a well-regulated thread scheduler that dispatches threads in an efficient manner between a parent stage/node and a child stage/node corresponding to a data structure.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure. With respect to the use of substantially any plural and/or singular terms herein, those having skill in the art can translate from the plural to the singular and/or from the singular to the plural as is appropriate to the context and/or application.

We claim:

1. A graph streaming processing system comprising:
   a thread scheduler comprising:
      at least one first sub-scheduler; and
      at least one second sub-scheduler,
      wherein the at least one first sub-scheduler is configured to:
        schedule a first set of threads of a first node to a first processor associated with the first node;
        initialize status of a completion pointer to an initial value, wherein the completion pointer is associated with a command buffer of the first node;
        detect execution of the first set of threads and generation of a data unit; and
        update the status of the completion pointer, in response to the generation of the data unit, to an updated value indicating the execution of the first set of threads; and wherein the at least one second sub-scheduler is configured to:
schedule a second set of threads for a plurality of second nodes to a second processor based on the status of the completion pointer, wherein the second processor is associated with the plurality of second nodes, wherein the second set of threads of the plurality of second nodes are dependent on the execution of the first set of threads.

2. The graph streaming processing system as claimed in claim 1, wherein the first processor and the second processor are any one of a processor array and an accelerator processor, and wherein the second processor comprises a plurality of processors to execute the second set of threads.

3. The graph streaming processing system as claimed in claim 1, wherein the command buffer is configured to temporarily store a predefined number of thread commands associated with the plurality of second nodes, wherein the first processor is configured to store the generated data unit in a data buffer associated with the plurality of second nodes.

4. The graph streaming processing system as claimed in claim 3, wherein a set of threads of the first node include a minimum number of threads ($T_{min}$) required to generate the data unit upon execution, wherein a size of the data buffer is based on a minimum number of data units ($D_{min}$) required to execute a set of threads of the plurality of second nodes, and wherein a size of the command buffer is based on $T_{min}$ of the first node, a number of the plurality of second nodes dependent on the first node and $D_{min}$.

5. The graph streaming processing system as claimed in claim 1, wherein the at least one second sub-scheduler is further configured to:
initialize status of a free pointer to an initial value, wherein the free pointer is associated with the command buffer;
detect an execution of the second set of threads of the plurality of second nodes by consuming the data unit in a data buffer; and
update the status of the free pointer to an updated value, in response to consumption of the data unit stored in the data buffer.

6. The graph streaming processing system as claimed in claim 5, wherein the status of the completion pointer indicates a number of thread commands, generated by the first node, stored in the command buffer upon execution of at least one set of threads of the first node and a number of data units generated by the first node and stored in the data buffer, and wherein the status of the free pointer indicates availability of free space in the command buffer to store a number of thread commands generated by the first node upon the execution of at least one set of threads of the first node and availability of free memory space in the data buffer to store a data unit generated by the execution of the at least one set of threads of the first node.

7. The graph streaming processing system as claimed in claim 1, wherein the at least one first sub-scheduler is further configured to:
read the updated value of the free pointer; and
schedule a subsequent set of threads of the first node to one of the processor array and the accelerator processor.

8. The graph streaming processing system as claimed in the claim 1, wherein the first processor is configured to:
receive the scheduled first set of threads from the at least one first sub-scheduler of the thread scheduler;
execute the first set of threads to generate the data unit and store the data unit in a data buffer;
emit a thread retire event comprising a set of thread commands upon the execution of the scheduled first set of threads of the first node; and
send the thread retire event to the at least one first sub-scheduler of the thread scheduler upon completing execution of the scheduled first set of threads.

9. The graph streaming processing system as claimed in claim 8, wherein to update the status of the completion pointer, the at least one first sub-scheduler is configured to:
receive the thread retire event from the first processor;
extract the set of thread commands from the thread retire event; and
write the set of thread commands into the command buffer.

10. The graph streaming processing system as claimed in claim 1, wherein to schedule a second set of threads of the plurality of second nodes to a second processor based on the status of the completion pointer, the at least one second sub-scheduler is configured to:
receive the thread commands from the command buffer based on an updated status of the completion pointer;
extract a data pointer of the data unit stored in a data buffer from the received thread commands; and
generate the second set of threads of the plurality of second nodes comprising the data pointer of the data unit.

11. The graph streaming processing system as claimed in the claim 1, wherein the second processor is configured to:
receive the scheduled second set of threads of the plurality of second nodes from the at least one second sub-scheduler of the thread scheduler;
execute the scheduled second set of threads of the plurality of second nodes consuming the data unit as input; and
send a plurality of thread retire events for the second set of threads associated with the plurality of second nodes to the at least one second sub-scheduler of the thread scheduler upon completing execution of the scheduled second set of threads.

12. The graph streaming processing system as claimed in claim 11, wherein the at least one second sub-scheduler is configured to detect the execution of the second set of threads of the plurality of second nodes based on the plurality of thread retire events received from the second processor.

13. The graph streaming processing system as claimed in claim 1, wherein for a plurality of first nodes, the at least one first sub-scheduler is configured to schedule a first set of threads for each of first nodes, and wherein the size of the command buffer is based on a plurality of $T_{min}$ of each of the first nodes, and $D_{min}$ for a set of threads of each second node of each of the first nodes.

14. A method performed by a graph streaming processing system, the method comprising:
scheduling, by at least one first sub-scheduler of a thread scheduler of the graph streaming processing system, a first set of threads of a first node to a first processor associated with the first node;
initializing, by the at least one first sub-scheduler, status of a completion pointer to an initial value, wherein the completion pointer is associated with a command buffer of the first node;
detecting, by the at least one first sub-scheduler, execution of the first set of threads and generation of a data unit;
updating, by the at least one first sub-scheduler, the status of the completion pointer, in response to the generation of the data unit, to an updated value indicating the execution of the first set of threads; and scheduling, by at least one second sub-scheduler of the thread scheduler, a second set of threads for a plurality of second nodes to a second processor based on the status of the completion pointer, wherein the second processor is associated with the plurality of second nodes, wherein the second set of threads of the plurality of second nodes are dependent on execution of the first set of threads.

15. The method as claimed in claim 14, wherein the method by the at least one second sub-scheduler further comprises:

initializing status of a free pointer to an initial value, wherein the free pointer is associated with the command buffer;

detecting execution of the second set of threads of the plurality of second nodes by consuming the data unit in a data buffer; and updating the status of the free pointer to an updated value, in response to consumption of the data unit stored in the data buffer.

16. The method as claimed in claim 15, wherein the status of the completion pointer indicates a number of thread commands generated by the first node stored in the command buffer upon execution of at least one set of threads of the first node and a data unit generated by the first node and stored in the data buffer, and wherein the status of free pointer indicates availability of free space in the command buffer to store a number of thread commands generated by the first node upon execution of at least one set of threads of the first node and availability of free memory space in the data buffer to store a data unit generated by the first node.

17. The method as claimed in claim 14, wherein the method further comprises:

reading the updated value of the free pointer; and scheduling a subsequent set of threads of the first node to one of the processor array and the accelerator processor.

18. The method as claimed in the claim 14, wherein the method performed by the first processor comprises:

receiving the scheduled first set of threads from the at least one first sub-scheduler of the thread scheduler;

executing the first set of threads to generate the data unit and storing the data unit in a data buffer;

emitting a thread retire event comprising a set of thread commands upon the execution of the scheduled first set of threads of the first node; and sending the thread retire event to the at least one first sub-scheduler of the thread scheduler upon completing execution of the scheduled first set of threads.

19. The method as claimed in the claim 18, wherein the method of updating the status of the completion pointer further comprises:

receiving the thread retire event from the first processor;

extracting the set of thread commands from the thread retire event; and writing the set of thread commands into the command buffer.

20. The method as claimed in the claim 14, wherein the method performed by the at least one second sub-scheduler comprises:

receiving the thread commands from the command buffer based on an updated status of the completion pointer;

extracting a data pointer of the data unit stored in a data buffer from the received thread commands; and generating the second set of threads for the plurality of second nodes comprising the data pointer of the data unit.

* * * * *